US011251858B2

(12) United States Patent
Lee et al.

(10) Patent No.: US 11,251,858 B2
(45) Date of Patent: Feb. 15, 2022

(54) APPARATUS AND METHOD FOR PERFORMING MEASUREMENT

(71) Applicant: Samsung Electronics Co., Ltd., Suwon-si (KR)

(72) Inventors: Namjeong Lee, Suwon-si (KR); Jung-Min Moon, Suwon-si (KR); Hyunseok Ryu, Yongin-si (KR); Peng Xue, Suwon-si (KR); Hyunil Yoo, Suwon-si (KR); Cheol Jeong, Seongnam-si (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/302,686

(22) Filed: May 10, 2021

(65) Prior Publication Data

US 2021/0281310 A1 Sep. 9, 2021

Related U.S. Application Data

(63) Continuation of application No. 16/857,980, filed on Apr. 24, 2020, now Pat. No. 11,005,555, which is a
(Continued)

(30) Foreign Application Priority Data

Sep. 29, 2016 (KR) .................. 10-2016-0125695

(51) Int. Cl.
*H04B 7/08* (2006.01)
*H04B 7/06* (2006.01)
(Continued)

(52) U.S. Cl.
CPC ........... *H04B 7/086* (2013.01); *H04B 7/0695* (2013.01); *H04B 7/088* (2013.01); *H04L 5/0048* (2013.01);
(Continued)

(58) Field of Classification Search
CPC ...... H04B 7/0695; H04B 7/088; H04B 7/024; H04B 7/0868; H04L 25/0226; H04L 5/0048; H04L 5/0094; H04W 24/10
See application file for complete search history.

(56) References Cited

U.S. PATENT DOCUMENTS 9,264,919 B2 2/2016 Gunnarsson et al.
10,771,207 B2 9/2020 Nishio et al.
(Continued)

FOREIGN PATENT DOCUMENTS

| WO | 2015020505 A | 2/2015 |
| WO | 2015109153 A1 | 7/2015 |
| WO | 2016086144 A1 | 6/2016 |

OTHER PUBLICATIONS

ISA/KR, "International Search Report and Written Opinion of the International Searching Authority," International Application No. PCT/KR2017/011019, dated Jan. 22, 2018, 14 pages.
(Continued)

*Primary Examiner* — Freshteh N Aghdam

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to various embodiments, an apparatus of a user equipment (UE) in a wireless environment comprises at least one transceiver; and at least one processor operably coupled to the at least one transceiver. The at least one transceiver is configured to receive a reference signal configuration comprising information for indicating whether a reference signal
(Continued)

of a transmission and reception point (TRP) is transmitted through beam sweeping from the TRP, and receive the reference signal from the TRP based on the received reference signal configuration.

16 Claims, 23 Drawing Sheets

Related U.S. Application Data continuation of application No. 16/434,040, filed on Jun. 6, 2019, now Pat. No. 10,673,515, which is a continuation of application No. 15/721,696, filed on Sep. 29, 2017, now Pat. No. 10,355,766.

(51) Int. Cl.
  *H04L 5/00* (2006.01)
  *H04L 25/02* (2006.01)
  *H04B 7/024* (2017.01)
  *H04W 24/10* (2009.01)

(52) U.S. Cl.
  CPC .......... *H04L 25/0226* (2013.01); *H04B 7/024* (2013.01); *H04B 7/0868* (2013.01); *H04L 5/0094* (2013.01); *H04W 24/10* (2013.01)

(56) References Cited

U.S. PATENT DOCUMENTS

| | | | |
|---|---|---|---|
| 10,779,176 B2* | 9/2020 | Park | H04W 16/32 |
| 2014/0112220 A1 | 4/2014 | Kwak et al. | |
| 2015/0358129 A1 | 12/2015 | Ryu et al. | |
| 2016/0150512 A1 | 5/2016 | Zhang et al. | |
| 2016/0205597 A1 | 7/2016 | Tu | |
| 2017/0041819 A1* | 2/2017 | Wu | H04W 76/19 |
| 2017/0332268 A1* | 11/2017 | Yang | H04W 72/042 |
| 2017/0346611 A1 | 11/2017 | Stirling-Gallacher et al. | |
| 2018/0034515 A1 | 2/2018 | Guo et al. | |
| 2018/0041936 A1 | 2/2018 | Kim et al. | |
| 2018/0092129 A1 | 3/2018 | Guo et al. | |
| 2018/0123869 A1 | 5/2018 | Singh et al. | |
| 2018/0249387 A1 | 8/2018 | Zhang et al. | |
| 2019/0123869 A1* | 4/2019 | Kakishima | H04L 5/0048 |
| 2019/0159050 A1* | 5/2019 | Futaki | H04W 72/085 |
| 2019/0182007 A1* | 6/2019 | Liu | H04L 5/003 |
| 2019/0215742 A1* | 7/2019 | Lu | H04W 36/14 |
| 2020/0329392 A1 | 10/2020 | Onggosanusi et al. | |

OTHER PUBLICATIONS

Interdigital Communications, "Considerations on reference signal design for NR," R1-167573, 3GPP TSG-RAN WG1 Meeting #86, Gothenburg, Sweden, Aug. 22-26, 2016, 7 pages.

Oppo, "DL PHY procedure issues for multi-beam based approaches," R1-166612, 3GPP TSG RAN WG1 Meeting #86, Gothenburg, Sweden, Aug. 22-26, 2016, 6 pages.

ZTE Corporation, et al., "Reference Signal Design for NR MIMO," R1-166213, 3GPP TSG RAN WG1 Meeting #86, Gothenburg, Sweden, Aug. 22-26, 2016, 8 pages.

Samsung, "Discussion on TRP beamforming and beam management," R1-166785, 3GPP TSG RAN WG1 #86, Gothenburg, Sweden, Aug. 22-26, 2016, 7 pages.

3rd Generation Partnership Project; Technical Specification Group Radio Access Network; Study on elevation beamforming/Full Dimension (FD) Multiple Input Multiple Output (MIMO) for LTE (Release 13), Technical Report, 3GPP TR 36.897 V13.0.0, Jun. 2015, 58 pages.

3rd Generation Partnership Project; Technical Specification Group Radio Access Network; Evolved Universal Terrestrial Radio Access (E-UTRA); Radio Resource Control (RRC); Protocol specification (Release 13), Technical Specification; 3GPP TS 36.331 V13.2.0, Jun. 2016, 623 pages.

Examination report dated Aug. 4, 2021 in connection with Indian Application No. 201917016675, 5 pages.

* cited by examiner

APPARATUS AND METHOD FOR PERFORMING MEASUREMENT

CROSS-REFERENCE TO RELATED APPLICATIONS

This application is a continuation of U.S. application Ser. No. 16/857,980, filed Apr. 24, 2020, which is a continuation of U.S. application Ser. No. 16/434,040, filed Jun. 6, 2019, now U.S. Pat. No. 10,673,515, which is a continuation of U.S. application Ser. No. 15/721,696, filed Sep. 29, 2017, now U.S. Pat. No. 10,355,766, which claims priority to Korean Patent Application Serial No. 10-2016-0125695 filed Sep. 29, 2016, the contents of which are incorporated herein by reference.

BACKGROUND

1. Field

The present disclosure relates generally to a wireless environment and, more particularly, relates to an apparatus and a method for performing a measurement.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, in order to cover various needs for wireless communication technology, network entities operating in different modes have been installed. Accordingly, a solution for performing a measurement by a User Equipment (UE) in a wireless environment in which network entities operating in different beam modes coexist is required.

SUMMARY

To address the above-discussed deficiencies, it is a primary object to provide an apparatus and a method for performing the measurement by receiving information required for the measurement from network entities capable of operating in various beam modes.

In accordance with an aspect of the present disclosure, an apparatus of a User Equipment (UE) in a wireless environment is provided. The apparatus includes: at least one transceiver; and at least one processor connected to the at least one transceiver and configured to control reception of a reference signal configuration including information for indicating whether a reference signal of a Transmission and Reception Point (TRP) is transmitted through beam sweeping from the TRP that provides a service to the UE, and to control reception of the reference signal from the TRP based on the received reference signal configuration.

In accordance with another aspect of the present disclosure, a method of a User Equipment (UE) in a wireless environment is provided. The method includes: receiving a reference signal configuration including information for indicating whether a reference signal of a Transmission and Reception Point (TRP) is transmitted through beam sweeping from the TRP that provides a service to the UE; and receiving the reference signal from the TRP based on the received reference signal configuration.

In accordance with another aspect of the present disclosure, an apparatus of a Transmission and Reception Point (TRP) is provided. The apparatus includes: at least one transceiver; and at least one processor connected to the at least one transceiver and configured to control reception of information for indicating a duration time (duration) of receive beam sweeping of the UE from the UE, to determine a measurement gap duration time (measurement gap duration) for another TRP pertaining to another cell having a center frequency different from a center frequency of a cell, to which the TRP pertains, based on the duration time of the receive beam sweeping of the UE, and to control transmission of a measurement configuration including information on a measurement gap configuration including data for indicating the measurement gap duration time to the UE.

In accordance with another aspect of the present disclosure, a method of a Transmission and Reception Point (TRP) is provided. The method includes: receiving information for indicating a duration time (duration) of receive beam sweeping of the UE from the UE; determining a measurement gap duration time (measurement gap duration) for another TRP pertaining to another cell having a center frequency different from a center frequency of a cell, to which the TRP pertains, based on the duration time of the receive beam sweeping of the UE; and transmitting a measurement configuration including information on a measurement gap configuration including data for indicating the measurement gap duration time to the UE.

An apparatus and a method according to various embodiments of the present disclosure can more efficiently perform the measurement in an environment in which network entities operating in different beam modes coexist by receiving information required for the measurement from the network entities.

Effects which can be acquired by the present disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
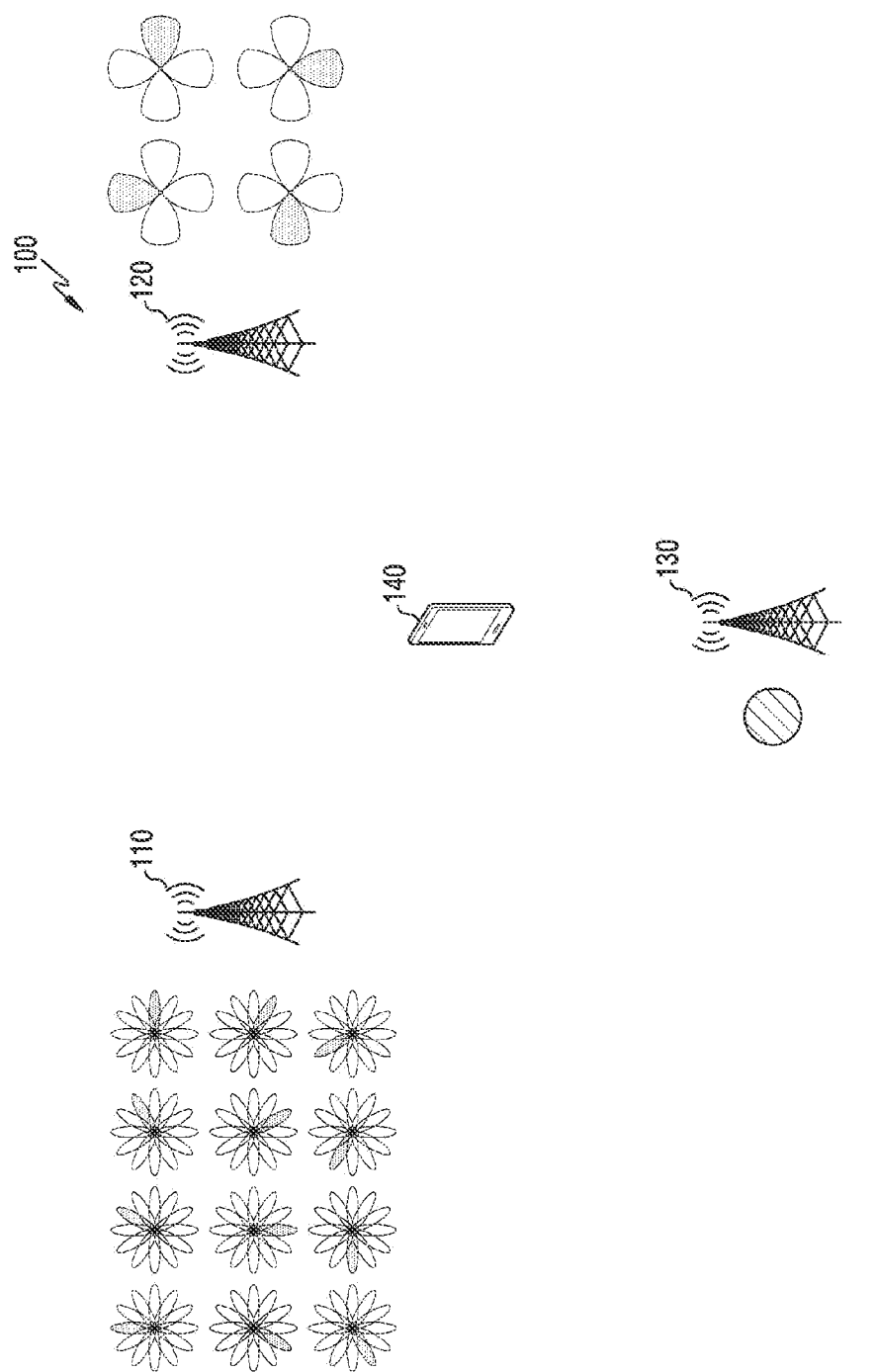
FIG. 1 illustrates a wireless environment including Transmission and Reception Points (TRPs) operating in different beam modes and a User Equipment (UE) according to various embodiments of the present disclosure.

FIGS. 1 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

For a high data transmission rate, a communication scheme for transmitting and receiving signals through an mmWave band that can use a wider bandwidth has been considered. The signal transmitted and received using the mmWave band has a relatively short transmission/reception distance due to high straightness and has relatively many path losses. In order to solve the problems, technology for transmitting and receiving signals through beams is being developed.

In a wireless communication system using the technology, a network entity transmitting or receiving signals through beams may operate in various beam modes. For example, the network entity may operate in a single beam mode in which the coverage of the network entity is covered through one beam. In another example, the network entity may operate in multi-beam mode in which a plurality of beams is used to increase gain in a specific area. The network entity operating in the multi-beam mode may perform beam sweeping or beam cycling to cover the coverage of the network entity.

As described above, the network entity may transmit reference signals in different transmission schemes based on the beam mode in which the network entity operates. For example, when the network entity operates in the single beam mode, the network entity may transmit reference signals without beam sweeping. In another example, when the network entity operates in the multi-beam mode, the network entity may transmit reference signals through beam sweeping.

Accordingly, a solution by which a User Equipment (UE) acquires information on the transmission scheme of the reference signals transmitted from the network entity is needed.

Meanwhile, in a wireless environment including cells having different center frequencies, in order to acquire information on a neighboring cell having a center frequency different from a center frequency of a serving cell, to which a serving eNB pertains, the UE may receive a reference signal transmitted from another eNB pertaining to the neighboring cell. For example, the UE may receive the reference signal transmitted from the other eNB to perform a handover to the other eNB pertaining to the neighboring cell. In another example, the UE may receive the reference signal transmitted from the other eNB to re-select the neighboring cell as the serving cell.

Since the center frequency of the neighboring cell is different from the center frequency of the serving cell, the UE may receive the reference signal transmitted from the other eNB for a duration time (for example, a measurement gap duration time) at a designated time point. When the UE is located near eNBs operating in the same beam mode, when one or more of the eNBs and the UE do not perform beam sweeping, and/or when the reference signal is transmitted based on one transmission scheme, a time required for normally receiving the reference signal transmitted from the other eNB may be substantially the same. In other words, the UE may normally measure the reference signal even though the reference signal transmitted from the other eNB is received for a predetermined measurement gap duration time.

However, when the UE is located near eNBs operating in different beam modes, when one or more of the eNBs and the UE perform beam sweeping, and/or when the reference signal is transmitted based on various transmission schemes, a time required for normally receiving the reference signal transmitted from the other eNB may vary. For example, the time required for normally receiving the reference signal transmitted from the other eNB without beam sweeping of the other eNB may be different from the time required for normally receiving the reference signal transmitted from the other eNB through beam sweeping. In another example, the time required for normally receiving the reference signal transmitted from the other eNB without beam sweeping of the UE may be different from the time required for normally receiving the reference signal through beaming sweeping of the UE.

Accordingly, based on the beam mode of the eNB, whether the UE performs beam sweeping, or the transmission scheme of the reference signal, a solution for variably determining the measurement gap duration time is needed.

FIG. 1 illustrates a wireless environment including Transmission and Reception Points (TRPs) operating in different beam modes and a User Equipment (UE) according to various embodiments of the present disclosure.

Referring to FIG. 1, a wireless environment 100 may include a TRP 110, a TRP 120, a TRP 130, and/or a UE 140. Each of the TRP 110, the TRP 120, and the TRP 130 may be a fixed device. In some embodiments, each of the TRP 110, the TRP 120, and the TRP 130 may be a next generation node B (gNB). Each of the TRP 110, the TRP 120, and the TRP 130 may be referred to as a base station, an enhanced node B (eNB), or an Access Point (AP). In some embodiments, each of the TRP 110, the TRP 120, and the TRP 130 may be a device pertaining to one eNB. For example, each of the TRP 110, the TRP 120, and the TRP 130 may be a device connected to or combined with one eNB operationally or functionally.

At least one TRP of the TRP 110, the TRP 120, and the TRP 130 may be a device that provides a wireless communication service to the UE 140.

In some embodiments, the TRP 110, the TRP 120, and the TRP 130 may pertain to the same cell. In some embodiments, the TRP 110, the TRP 120, and the TRP 130 may pertain to be different cells.

The TRP 110 may be a device operating in a multi-beam mode. The term "multi-beam mode" may refer to a mode in which beam sweeping or beam cycling is required to cover the coverage of the TRP 110. Further, the term "beam sweeping" or "beam cycling" may refer to an operation for sequentially transmitting signals having the same characteristic or attribute through a plurality of beams of the TRP 110, in order to cover the coverage of the TRP 110. In addition, the term "beam sweeping" or "beam cycling" may refer to an operation used for determining which beam is most suitable for a particular UE within the coverage of the TRP 110 (for example, a beam having highest reception power in the particular terminal) among the plurality of beams of the TRP 110.

The TRP 110 may perform the beam sweeping on twelve transmit beams (first to twelfth transmit beams). The twelve transmit beams may be beams used for increasing transmission gains in different particular areas within the coverage of the TRP 110. The TRP 110 may sequentially transmit signals having the same characteristics through the first to twelfth transmit beams in order to cover the entire coverage of the TRP 110. For example, in order to allow all UEs within the coverage of the TRP 110 to receive common control information or broadcast information, the TRP 110 may transmit the common control information or the broadcast information through the beam sweeping. In another example, in order to provide the highest transmission rate to a terminal located in a particular area within the coverage of the TRP 110, the TRP 110 may transmit reference signals through the beam sweeping. The terminal having received the reference signals sequentially transmitted through the twelve transmit beams may determine (identify or select) a beam corresponding to the particular area in which the UE is located among the twelve transmit beams, and thus receive user data transmitted from the TRP 110 at a high transmission rate.

A beam mode of the TRP 110 may be switched according to one or more of a state of the TRP 110 and a state of at least one UE located within the coverage of the TRP 110. For example, the TRP 110 may switch the beam mode of the TRP 110 from a multi-beam mode to a single beam mode (the definition thereof will be described below) as necessary.

The TRP 120 may be a device operating in the multi-beam mode. The TRP 120 may perform the beam sweeping on four transmit beams (first to fourth transmit beams). For example, in order to allow all UEs within the coverage of the TRP 120 to receive common control information or broadcast information, the TRP 120 may transmit the common control information or the broadcast information through the beam sweeping. In another example, in order to provide the highest transmission rate to terminals located in a particular area within the coverage of the TRP 120, the TRP 120 may transmit a reference signal through the beam sweeping.

Meanwhile, in some embodiments, each of the four transmit beams of the TRP 120 may have a gain lower than that of each of the twelve transmit beams of the TRP 110. However, each of the four transmit beams of the TRP 120 may cover a wider area compared to the twelve transmit beams of the TRP 110.

The beam mode of the TRP 120 may switch according to one or more of a state of the TRP 120 and a state of at least one UE located within the coverage of the TRP 120. For example, the TRP 120 may switch the beam mode of the TRP 120 from a multi-beam mode to a single beam mode (the definition thereof will be described below) as necessary.

The TRP 130 may be a device operating in the single beam mode. The term "single beam mode" may refer to a mode in which the beam sweeping is not required to cover the coverage of the TRP 130. For example, in order to allow all UEs within the coverage of the TRP 130 to receive common control information or broadcast information, the TRP 130 may transmit the common control information or the broadcast information without beam sweeping. In another example, the TRP 130 may transmit a reference signal without beam sweeping.

Meanwhile, the transmit beam of the TRP 130 may have a gain lower than that each of the transmit beams of the TRP 110 or of each of the transmit beams of the TRP 120. However, each of the four transmit beams of the TRP 120 may cover a wider area compared to each of the transmit beams of the TRP 110 or each of the transmit beams of the TRP 120.

The beam modes of the TRP 130 may switch according to one or more of a state of the TRP 130 and a state of at least one UE located within the coverage of the TRP 130. For example, the TRP 130 may switch the beam mode of the TRP 130 from the single beam mode to the multi-beam mode as necessary.

The UE 140 may be a device having mobility. For example, the UE 140 may be a mobile phone, a smart phone, a music player, a portable game console, a navigation system, or a laptop computer. The UE 140 may be also referred to as a mobile station, a terminal, a STA (station), or a user device.

The UE 140 may be a device located around the TRP 110, the TRP 120, or the TRP 130.

The UE 140 may be a device that receives a wireless communication service from one or more TRPs of the TRP 110, the TRP 120, and the TRP 130.

For example, when the UE 140 is the device that receives the service from the TRP 110, the UE 140 may receive a reference signal transmitted from the TRP 110 through beam sweeping. Further, the UE 140 may receive a reference signal transmitted from the TRP 120 through beam sweeping in order to perform a handover or a cell re-selection. The UE 140 may receive a reference signal transmitted from the TRP 130 without beam sweeping in order to perform a handover or a cell re-selection. The UE 140 may receive control information or user data from the TRP 110 or transmit control information or user data to the TRP 110. In another example, when the UE 140 is the device that receives the service from the TRP 120, the UE 140 may receive a reference signal transmitted from the TRP 120 through beam sweeping. Further, the UE 140 may receive a reference signal transmitted from the TRP 110 through beam sweeping in order to perform a handover or a cell re-selection. The UE 140 may transmit a reference signal transmitted from the TRP 130 without beam sweeping in order to perform a handover or a cell re-selection. The UE 140 may receive control information or user data from the TRP 120 or transmit control information or user data to the TRP 120.

In another example, when the UE 140 is the device that receives the service from the TRP 130, the UE 140 may receive a reference signal transmitted from the TRP 130 without beam sweeping. Further, the UE 140 may receive a reference signal transmitted from the TRP 110 or the TRP 120 through beam sweeping in order to perform a handover or a cell re-selection. The UE 140 may receive control information or user data from the TRP 130 or transmit control information or user data to the TRP 130.

In the present disclosure, the reference signal for the handover or the cell re-selection may refer to a reference signal for layer-3 (L3) mobility. Particularly, the UE may perform a Radio Resource Management (RRM) measurement based on the above-described reference signal, and use a result of the RRM measurement for L3 mobility.

In the present disclosure, when the reference signal for L3 mobility is configured in the UE, Resource Element (RE) mapping of a Channel State Information (CSI)-Reference Signal (RS) used for beam management in a system operating in the multi-beam mode and a parameter used for indicating density may be identically used. However, a configuration parameter (for example, periodicity of the reference signal) for L3 mobility is not necessarily required to be the same as periodicity of the CSI-RS used for beam management. Each of the TRP and the UE described below in the present document may be located within the wireless environment 100. Further, each of the TRPs described below in the present document may correspond to the TRP 110, the TRP 120, and/or the TRP 130, respectively. In addition, the UE described below in the present document may correspond to the UE 140.

Figure 2:
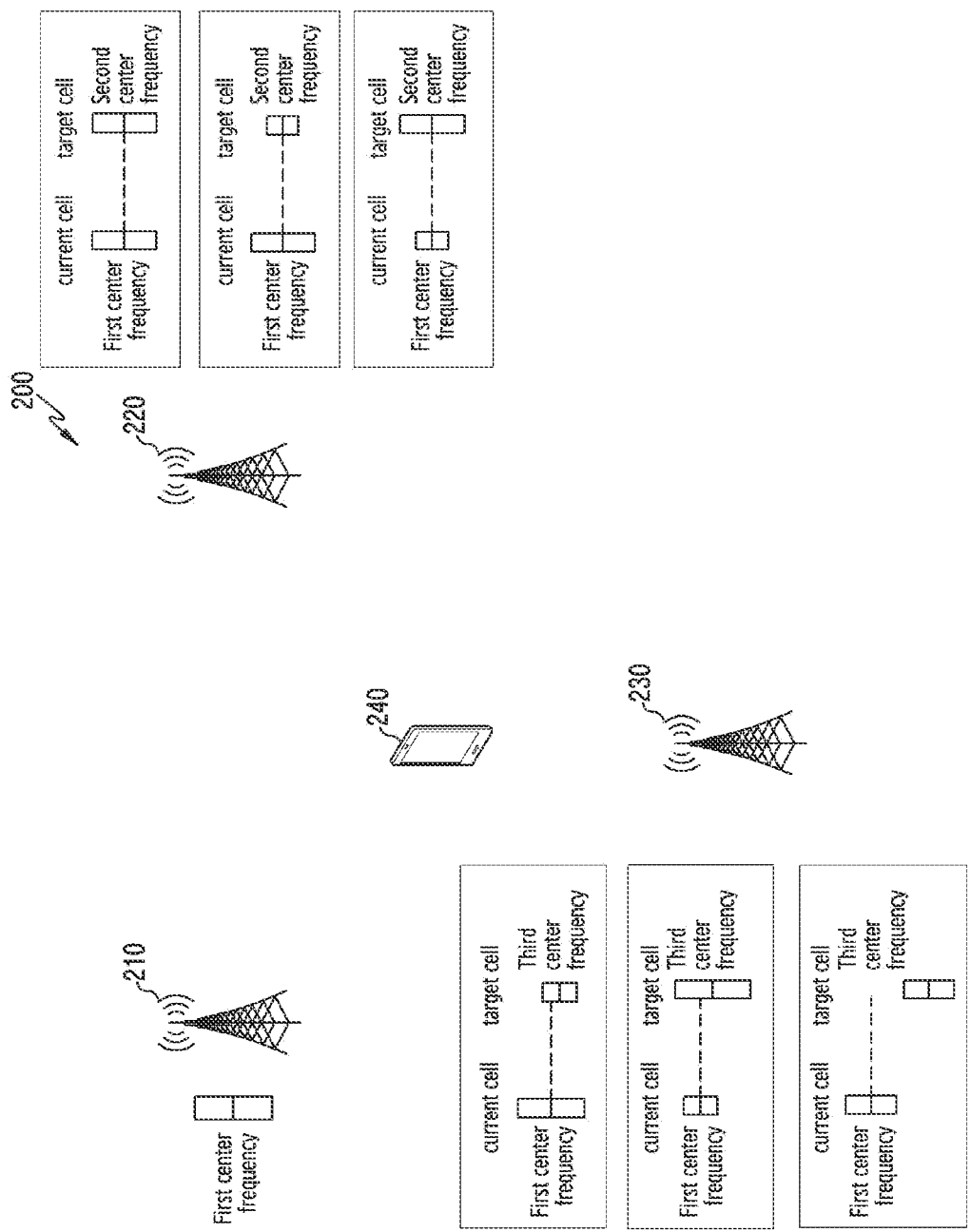
FIG. 2 illustrates a wireless environment including TRPs having the same carrier frequency band or different carrier frequency bands and a UE according to various embodiments of the present disclosure.

FIG. 2 illustrates a wireless environment including TRPs having the same carrier frequency band or different carrier frequency bands and a UE according to various embodiments of the present disclosure.

Referring to FIG. 2, a wireless environment 200 may include a TRP 210, a TRP 220, a TRP 230, and/or a UE 240.

The TRP 210 may be a TRP to which the UE 240 is connected. In other words, a cell to which the TRP 210 pertains may be a serving cell of the UE 240.

The TRP 210 may be a TRP that transmits a signal on a first carrier frequency band corresponding to a carrier frequency band determined based on a first center frequency corresponding to a center frequency of the cell to which the TRP 210 pertains.

The TRP 220 may be a TRP located near the TRP 210. Further, the TRP 220 may be a TRP to which the UE 240 is not connected. In other word, in some embodiments, the TRP 220 may a neighboring TRP of the TRP 210. In some embodiments, the TRP 220 may be a TRP pertaining to a neighboring cell of a cell to which the TRP 210 pertains.

The TRP 220 may pertain to a cell having a second center frequency that corresponds to or is the same as the first center frequency. The TRP 220 may be a TRP that transmits a signal on a second carrier frequency band corresponding to a carrier frequency band determined based on the second center frequency.

In some embodiments, a bandwidth of the second carrier frequency band may be the same as a bandwidth of the first carrier frequency band. In some embodiments, the bandwidth of the second carrier frequency band may be narrower than the bandwidth of the first carrier frequency band. In some embodiments, the bandwidth of the second carrier frequency band may be wider than the bandwidth of the first carrier frequency band. In other words, a relation between the bandwidth of the second carrier frequency band and the bandwidth of the first carrier frequency band may be an intra-frequency relation.

The TRP 230 may be a TRP located near the TRP 210. Further, the TRP 230 may be a TRP to which the UE 240 is not connected. In other word, in some embodiments, the TRP 230 may a neighboring TRP of the TRP 210. In some embodiments, the TRP 230 may be a TRP pertaining to a neighboring cell of a cell to which the TRP 210 pertains.

The TRP 230 may pertain to a cell having a third center frequency different from the first center frequency. The TRP 230 may be a TRP that transmits a signal on a third carrier frequency band corresponding to a carrier frequency band determined based on the third center frequency.

In some embodiments, a bandwidth of the third carrier frequency band may be the same as the bandwidth of the first carrier frequency band. In some embodiments, the bandwidth of the third carrier frequency band may be narrower than the bandwidth of the first carrier frequency band. In some embodiments, the bandwidth of the third carrier frequency band may be wider than the bandwidth of the first carrier frequency band. In other words, a relation between the bandwidth of the third carrier frequency band and the bandwidth of the first carrier frequency band may be an inter-frequency relation.

The UE 240 may receive a reference signal from the TRP 210. The reference signal of the TRP 210 may be transmitted through beam sweeping or without beam sweeping. Further, the UE 240 may receive a reference signal from the TRP 220 for a handover or a cell re-selection. The reference signal of the TRP 220 may be transmitted through beam sweeping or without beam sweeping. Further, the UE 240 may receive a reference signal from the TRP 230 for a handover or a cell re-selection. The reference signal of the TRP 230 may be transmitted through beam sweeping or without beam sweeping.

Each of the TRPs and the UE described below in the present document may be located within the wireless environment 200. Further, each of the TRPs described below in the present document may correspond to the TRP 210, the TRP 220, and/or the TRP 230, respectively. In addition, the UE described below in the present document may correspond to the UE 240.

Figure 3A:
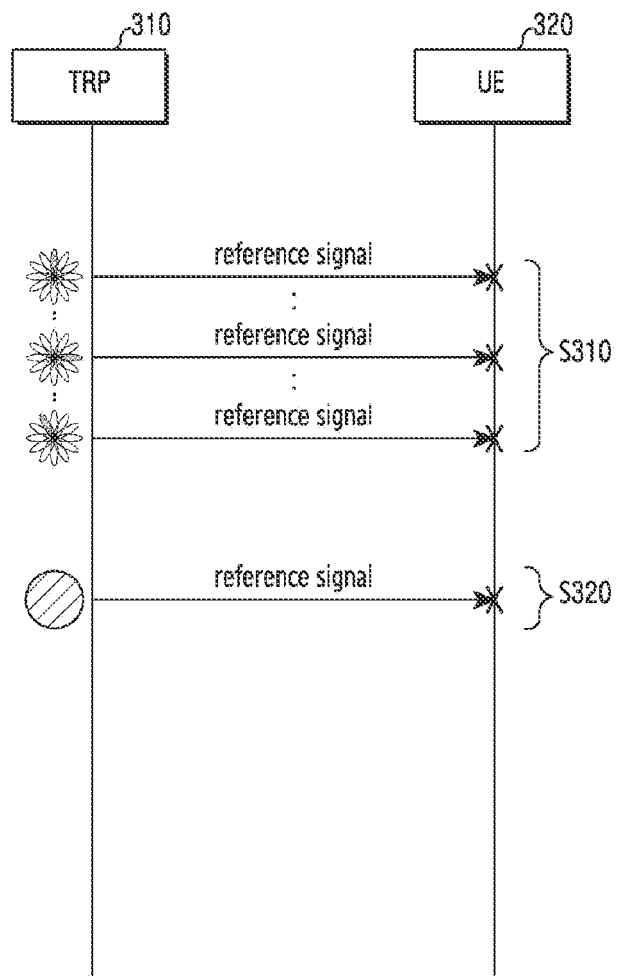
FIG. 3A illustrates an example of the signal flow between a TRP operating in various beam modes and a UE.

FIG. 3A illustrates an example of the signal flow between a TRP operating in various beam modes and a UE.

In FIG. 3A, a TRP 310 may be a TRP operating in the multi-beam mode. In other words, the TRP 310 may transmit a reference signal through beam sweeping. Further, the TRP 310 may a TRP operating the single beam mode. In other words, the TRP 310 may transmit a reference signal without beam sweeping.

A UE 320 may be a UE connected to the network through the TRP 310 or a UE located within the coverage of the TRP 310. The UE 320 may be a UE operating in the state in which the UE 320 is not aware of the beam mode of the TRP 310. Further, the UE 320 may be a UE operating in the state in which the UE 320 is not aware of a transmission scheme of the reference signal of the TRP 310. In other words, the UE 320 may be a UE operating in the state in which the UE 320 is not aware of whether the reference signal of the TRP 310 is transmitted through beam sweeping.

Referring to FIG. 3A, in step S310, the TRP 310 may transmit the reference signal through beam sweeping. Since the UE 320 operates in the state in which the UE 320 is not aware of whether the reference signal of the TRP 310 is transmitted through beam sweeping, the UE 320 may not normally receive the reference signal transmitted from the TRP 310 through beam sweeping. For example, when it is assumed that the reference signal of the TRP 310 is transmitted without beam sweeping, the UE 320 may not normally receive the reference signal from the TRP 310 through beam sweeping.

Since the UE 320 did normally receive the reference signal, the UE 320 may not perform a normal measurement based on the reference signal. For example, since the UE 320 did normally receive the reference signal, the UE 320 may not accurately recognize the current state of a channel between the TRP 310 and the UE 320. Accordingly, when the UE 320 transmit a measurement report on the reference signal to the TRP 310, the measurement report may contain information that does not correspond to the current state of the channel between the TRP 310 and the UE 320.

In step S320, the TRP 310 may transmit the reference signal without beam sweeping. Since the UE 320 operates in the state in which the UE 320 is not aware of whether the reference signal of the TRP 310 is transmitted without beam sweeping, the UE 320 may not normally receive the reference signal transmitted from the TRP 310 without beam sweeping. For example, when it is assumed that the reference signal of the TRP 310 is transmitted through beam sweeping, the UE 320 may not normally receive the reference signal transmitted from the TRP 310 without beam sweeping.

Since the UE 320 did not normally receive the reference signal, the UE 320 may not perform a normal measurement based on the reference signal. For example, since the UE 320 did not normally receive the reference signal, the UE 320 may not accurately recognize the current state of the channel between the TRP 310 and the UE 320. Accordingly, when the UE 320 transmits the measurement report on the reference signal to the TRP 310, the measurement report may contain information that does not corresponding to the current state of the channel between the TRP 310 and the UE 320.

As described above, when the UE is located within the coverage of the TRP capable of switching the beam mode, the UE is required to acquire information on the reference signal transmitted from the TRP (for example, information indicating whether the reference signal is transmitted through beam sweeping) to efficiently perform the measurement.

Accordingly, various embodiments of the present disclosure provide a structure for the information on the reference signal or a procedure for transmitting or receiving the information on the reference signal in order to perform the efficient measurement of the reference signal.

Figure 3B:
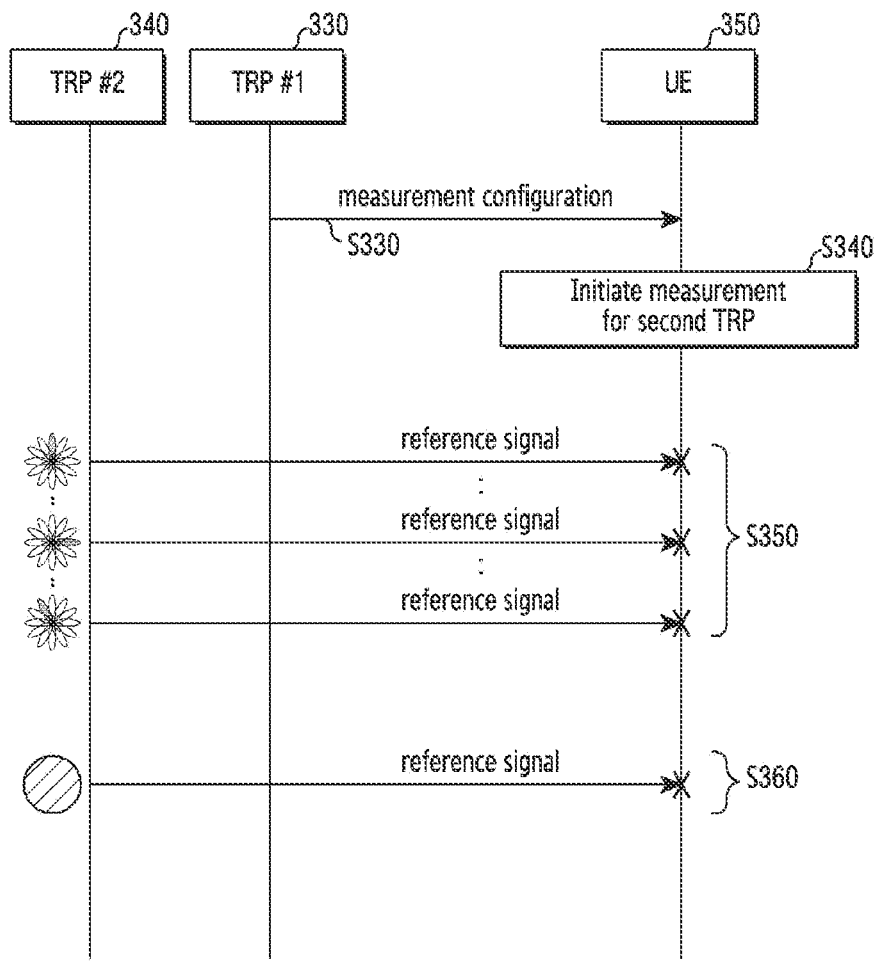
FIG. 3B illustrates an example of the signal flow between TRPs operating in various beam modes and a UE.

FIG. 3B illustrates an example of the signal flow between TRPs operating in various beam modes and a UE.

In FIG. 3B, each of a first TRP 330 and a second TRP 340 may be a TRP operating in the multi-beam mode. In other words, each of the first TRP 330 and the second TRP 340 may transmit a reference signal through beam sweeping. Further, each of the first TRP 330 and the second TRP 340 may be a TRP operating in the single beam mode. In other words, each of the first TRP 330 and the second TRP 340 may transmit a reference signal without beam sweeping.

A UE 350 may be a UE connected to the network through the first TRP 330.

The second TRP 340 may be a TRP located near the first TRP 330 and the UE 350. In other words, the second TRP 340 may be a neighboring TRP of the first TRP 330.

The UE 350 may be a UE operating in the state in which the UE 350 is not aware of the beam mode of the second TRP 340. Further, the UE 350 may be a UE operating in the state in which the UE 350 is not aware of a transmission scheme of the reference signal of the second TRP 340. In other words, the UE 350 may be a UE operating in the state in which the UE 350 is not aware of whether the reference signal of the second TRP 340 is transmitted through beam sweeping.

Referring to FIG. 3B, in step S330, the first TRP 330 may transmit a measurement configuration to the UE 350. The measurement configuration may be used for indicating the performance of the measurement on the second TRP 340 by the UE 350. Alternatively, the measurement configuration may be used for indicating the performance of the measurement by the UE 350 on the first TRP 330 in addition to the second TRP 340. That is, the measurement configuration may include the measurement configuration for the first TRP 330 and/or the second TRP 340. The measurement configuration may include information on a cell (that is, information on a measurement object) to be measured by the UE 350. For example, the information on the measurement object may contain data on a frequency channel number to be measured by the UE 350, data on a physical cell identifier (ID) of a cell to be measured by the UE 350, and data on an offset of a cell to be measured by the UE 350. Further, the measurement configuration may further contain information on a condition under which the UE 350 transmits the measurement report for the cell. The measurement configuration may further contain a measurement ID that is information for identifying the measurement object. The measurement configuration may further contain information for indicating values (for example, Reference Signal Received Power (RSRP) and Received Signal Strength Indication (RSSI)) to be measured by the UE. The measurement configuration may contain a measurement window periodicity, a measurement duration, and offset (measurement window offset) information for indicating a time point on a time axis at which the measurement window starts. All the above-described measurement configuration information may be identically contained when the second TRP 340 is a TRP having an intra or inter-frequency. This is identically applied to all the measurement configurations used in the present document. When the second TRP 340 is a TRP having the inter-frequency, the measurement configuration may further contain a measurement gap configuration that is information for indicating a time point at which the reference signal transmitted from the second TRP 340 is received. The measurement gap information may be information that is the same as the above-described measurement duration, and may be certainly contained in the measurement configuration even when the second TRP 340 is a TRP having the intra-frequency.

In step S340, the UE 350 may initiate the measurement for the second TRP 340. For example, when the second TRP 340 is the TRP having the intra-frequency, the UE 350 may perform the measurement on the second TRP 340 at a time point defined by the Long Term Evolution (LTE) standard. In another example, when the second TRP 340 is the TRP having the inter-frequency, the UE 350 may perform the measurement on the second TRP 340 based on the measurement gap configuration contained in the measurement configuration.

In step S350, the second TRP 340 may transmit the reference signal through beam sweeping. Since the UE 350 operates in the state in which the UE 350 is not aware of whether the reference signal of the second TRP 340 is transmitted through beam sweeping, the UE 350 may not normally receive the reference signal transmitted from the second TRP 340 through beam sweeping. For example, when it is assumed that the reference signal of the second TRP 340 is transmitted without beam sweeping, the UE 350 may not normally receive the reference signal transmitted from the second TRP 340 through beam sweeping.

Since the UE 350 did not normally receive the reference signal, the UE 350 may not perform a normal measurement based on the reference signal transmitted from the second TRP 340 even though the measurement for the second TRP 340 has been initiated. For example, since the UE 350 did not normally receive the reference signal, the UE 350 may not accurately recognize the current state of a channel between the second TRP 340 and the UE 350. Accordingly, when the UE 350 transmits a measurement report on the reference signal to the first TRP 330, the measurement report may contain information that does not corresponding to the current state of the channel between the second TRP 340 and the UE 350.

In step S360, the second TRP 340 may transmit the reference signal without beam sweeping. Since the UE 350 operates in the state in which the UE 350 is not aware of whether the reference signal of the second TRP 340 is transmitted through beam sweeping, the UE 350 may not normally receive the reference signal from the second TRP 340 without beam sweeping. For example, when it is assumed that the reference signal of the second TRP 340 is transmitted through beam sweeping, the UE 350 may not normally receive the reference signal transmitted without beam sweeping.

Since the UE 350 did not normally receive the reference signal, the UE 350 may not normally perform the measurement based on the reference signal. For example, since the UE 350 did not normally receive the reference signal, the UE 350 may not accurately recognize the current state of a channel between the second TRP 340 and the UE 350. Accordingly, when the UE 350 transmits a measurement report on the reference signal to the first TRP 330, the measurement report may contain information that does not correspond to the current state of the channel between the second TRP 340 and the UE 350.

As described above, when the UE is located near the neighboring TRP capable of switching the bam mode, the UE is required to acquire information on the reference signal transmitted from the neighboring TRP in order to efficiently perform the measurement.

Accordingly, various embodiments of the present disclosure provide a structure for the information on the reference signal and a procedure in which the UE recognizes the information on the reference signal transmitted from the neighboring eNB for the efficient measurement for the reference signal.

Figure 4:
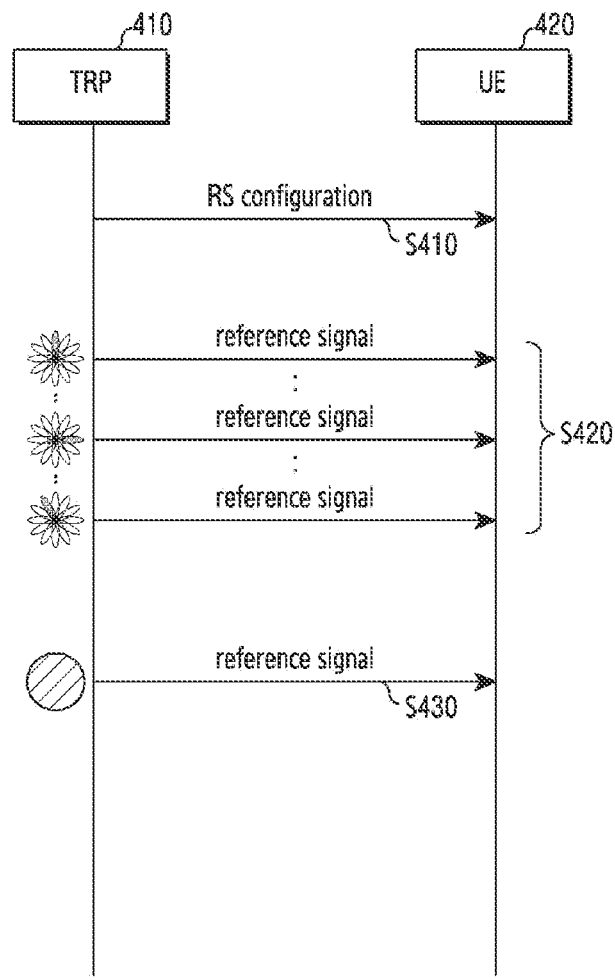
FIG. 4 illustrates an example of the signal flow between a TRP and a UE according to various embodiments of the present disclosure.

FIG. 4 illustrates an example of the signal flow between a TRP and a UE according to various embodiments of the present disclosure.

Referring to FIG. 4, in step S410, a TRP 410 may transmit a reference signal configuration. A UE 420 may receive the reference signal configuration from the TRP 410. The reference signal configuration may be information related to a cell to which the TRP 410 pertains. For example, the reference signal configuration (reference signal setting) transmitted by the TRP 410 may be a reference signal configuration of the cell to which the TRP 410 pertains. The reference signal configuration may be information broadcasted to inform UEs located with the coverage of the TRP 410 of a pattern of the reference signal of the TRP 410 or a transmission scheme of the reference signal of the TRP 410. Further, the reference signal configuration may be information broadcasted to inform the UEs located with the coverage of the TRP 410 of whether the reference signal of the TRP 410 is transmitted through beam sweeping. In addition, the reference signal configuration may be information broadcasted to inform the UEs located with the coverage of the TRP 410 of a format of the reference signal of the TRP 410. The cell to which the TRP 410 pertains may be a serving cell to which the UE 420 is connected. Alternatively, the cell to which the TRP 410 pertains may be a neighboring cell to which the UE 420 is not connected but performs the measurement therefor to consider a handover thereto.

The term "reference signal configuration of the TRP" used in the present document may refer to a reference signal configuration of the cell to which the TRP pertains.

The reference signal configuration may contain information for indicating whether the reference signal of the TRP 410 is transmitted through beam sweeping.

In some embodiments, the information for indicating whether the reference signal of the TRP 410 is transmitted through beam sweeping may include data for indicating the number of antenna ports used for transmitting the reference signal of the TRP 410. For example, a pattern of the reference signal of the TRP 410 is defined for each of the number of at least one antenna port used for transmitting the reference signal of the TRP 410, the information for indicating whether the reference signal of the TRP 410 is transmitted through beam sweeping may include data for indicating the number of antenna ports used for transmitting the reference signal of the TRP 410. It is assumed that the number of antenna ports of the TRP 410 used when the reference signal of the TRP 410 is transmitted through beam sweeping of A beams is K, the number of antenna ports of the TRP 410 used when the reference signal of the TRP 410 is transmitted through beam sweeping of B beams is M, and the number of antenna ports of the TRP 410 used when the reference signal of the TRP 410 is transmitted without beam sweeping is N. For example, when the UE 420 receives the reference signal configuration including the data for indicating K, the UE 420 may identify that the reference signal of the TRP 410 is transmitted through beam sweeping based on the data for indicating K. In another example, when the UE 420 receives the reference signal configuration including the data for indicating N, the UE 420 may identify that the reference signal of the TRP 410 is transmitted without beam sweeping based on the data for indicating N.

In some embodiments, the information for indicating whether the reference signal of the TRP 410 is transmitted through beam sweeping may include data for indicating a duration time of the transmission of the reference signal of the TRP 410. For example, when the pattern of the reference signal of the TRP 410 is defined for each duration time of the transmission of the reference signal of the TRP 410, the information for indicating whether the reference signal of the TRP 410 is transmitted through beam sweeping may include data for indicating the duration time of the transmission of the reference signal of the TRP 410. It is assumed that the spent (or required) duration time of the transmission of the reference signal when the reference signal of the TRP 410 is transmitted through beam sweeping of A beams is K, the spent duration time of the transmission of the reference signal when the reference signal of the TRP 410 is transmitted through beam sweeping of B beams is M, and the spent duration time of the transmission of the reference signal when the reference signal of the TRP 410 is transmitted without beam sweeping is N. For example, when the UE 420 receives the reference signal configuration including the data for indicating M, the UE 420 may identify that the reference signal of the TRP 410 is transmitted through beam sweeping based on the data for indicating M. Further, the UE 420 may identify that the time of M is required to receive the reference signal of the TRP. In another example, when the UE 420 receives the reference signal configuration including the data for indicating N, the UE 420 may identify that the reference signal of the TRP 410 is transmitted without beam sweeping based on the data for indicating N. Further, the UE 420 may identify that the time of N is required to receive the reference signal of the TRP.

In other embodiment, the information for indicating whether the reference signal of the TRP 410 is transmitted through beam sweeping may include data indicating for the beam mode of the TRP 410. For example, when the TRP 410 operates in the single beam mode, the TRP 410 may transmit the reference signal configuration including the data for indicating that the TRP 410 operates in the single beam mode. In this case, the UE having received the reference signal configuration may identify that the reference signal of the TRP 410 is transmitted without beam sweeping based on the data for indicating that the TRP 410 operates in the single beam mode. In another example, when the TRP 410 operates in the multi-beam mode, the TRP 410 may transmit the reference signal configuration including data for indicating the TRP 410 operates in the multi-beam mode. In this case, the UE having received the reference signal configuration may identify that the reference signal of the TRP 410 is transmitted through beam sweeping based on the data for indicating that the TRP 410 operates in the multi-beam mode.

In some embodiments, the information for indicating whether the reference signal of the TRP 410 is transmitted through beam sweeping may include data for indicating a transmission pattern of the reference signal of the TRP 410.

In some embodiments, the reference signal configuration may contain all or some of the information shown in Table 1 below.

TABLE 1 beam mode indication
number of antenna port for transmission of reference signal
Tx periodicity of reference signal
sweeping duration
offset
Tx pattern
Location in frequency domain In Table 1 above, "beam mode indication" may include data for indicating the current beam mode of the TRP 410, "number of antenna ports for transmission of reference signal" may include data for indicating the number of antenna ports used for transmitting the reference signal of the TRP 410, "Tx periodicity of reference signal" may include data for indicating transmission periodicity of the reference signal of the TRP 410, and "sweeping duration" may include data for indicating a time spent for beam sweeping when the reference signal of the TRP 410 is transmitted through beam sweeping. A periodicity value of the reference signal of the TRP 410 may be selected from {5, 10, 20, 40, [80, 160]} milliseconds (ms). When the reference signal of the TRP 410 is transmitted without beam sweeping, the data for indicating the time spent for the beam sweeping may be set as "0" or by default. Further, in Table 1, "offset" may include data for indicating a reference position at which the reference signal of the TRP 410 is transmitted. The reference position may be a time position or a frequency position which is the reference of transmission of the reference signal of the TRP 410, or may be time and frequency positions. When "offset" is the time position which is the reference of transmission of the reference signal of the TRP 410, "offset" may include information regarding at least one of a radio frame, a subframe, a slot, and an OFDM symbol in which the reference signal is transmitted. Further, in Table 1 above, "Tx pattern" may include data for indicating a transmission pattern of the reference signal of the TRP 410. The "Tx pattern" may be information for resources where the reference signal is mapped and transmitted. The "Tx pattern" corresponds to the RE to which the reference signal is mapped and transmitted within the subframe or the slot. The information may be reused based on an RE mapping scheme of the CSI-RS for beam management. Examples of the transmission pattern of the reference signal of the TRP 410 will be described in FIG. 5. Further, in Table 1 above, "location in frequency domain" may include data for indicating a position and a bandwidth in a frequency domain at which the reference signal of the TRP 410 is transmitted or the measurement of the UE is performed. At this time, the bandwidth of the reference signal may be expressed by an absolute value, or, after some candidate values are determined, may be selected from the candidate values. The position and the bandwidth in the frequency domain may refer to an absolute bandwidth (the number of RBs) or may be selected from candidate values that correspond to a minimum carrier BW or wider bandwidth values. Further, since the TRP may be associated with a particular cell, the reference signal configuration may include a cell ID for transmitting the corresponding reference signal. In addition, the reference signal configuration may include a parameter for generating a reference signal sequence, numerology of the reference signal, and QCL information with an SS block transmit beam. The numerology of the reference signal may be one or more selected from subcarrier spacing available when data is transmitted in the corresponding frequency domain, subcarrier spacing available when the CSI-RS for beam management is transmitted, and subcarrier spacing used when the SS block is transmitted. The SS block is the unit including a PSS/SSS/PBCH, and may be transmitted through beam sweeping in a multi-beam-based system.

In some embodiments, the reference signal configuration may include all or some of the information shown in Table 2 below.

TABLE 2

[Common information]

beam mode indication
number of antenna port for transmission of reference signal
Tx periodicity of reference signal
offset
location in frequency domain
[beam mode related information]

1) single beam mode: blank or Tx pattern
2) multi beam mode: sweeping duration

In Table 2 above, "common information" refers to a region identically analyzed by the UE 420 regardless of the beam mode of the TRP 410, and "beam mode related information" refers to a region differently analyzed by the UE 420 depending on the beam mode of the TRP 410. For example, information indicated by "beam mode related information" when the beam mode of the TRP 410 is the single beam mode and a value of "beam mode related information" is A may be different from information indicated by "beam mode related information" when the beam mode of the TRP 410 is the multi-beam mode and a value of "beam mode related information" is A.

Further, in Table 2 above, "beam mode indication" may include data for indicating the current beam mode of the TRP 410, "number of antenna ports for transmission of reference signal" may include data for indicating the number of antenna ports used for transmitting the reference signal of the TRP 410, "Tx periodicity of reference signal" may include data for indicating the transmission periodicity of the reference signal of the TRP 410, "offset" may include data for indicating a reference position at which the reference signal of the TRP is transmitted, and "location in frequency domain" may include data for indicating the position and the bandwidth in the frequency domain at which the reference signal of the TRP 410 is transmitted or the measurement of the UE is performed. A periodicity value of the reference signal of the TRP 410 may be selected from {5, 10, 20, 40, [80, 160]} ms. When "offset" is the time position which is the reference of transmission of the reference signal of the TRP 410, "offset" may include information regarding one or more of a radio frame, a subframe, a slot, and an OFDM symbol, in which the reference signal is transmitted. At this time, the bandwidth of the reference signal may be expressed by an absolute value, or, after some candidate values are determined, may be selected from the candidate values. The position and the bandwidth in the frequency domain may refer to an absolute bandwidth (the number of RBs) or selected from candidate values that correspond to a minimum carrier BW or wider bandwidth values. Further, since the TRP may be associated with a particular cell, the reference signal configuration may include a cell ID for transmitting the corresponding reference signal. In addition, the reference signal configuration may include a parameter for generating a reference signal sequence, numerology of the reference signal, and QCL (quasi co-locate) information with an SS block transmit beam. The numerology of the reference signal may be one of or selected from subcarrier spacing available when data is transmitted in the corresponding frequency domain, subcarrier spacing available when the CSI-RS for beam management is transmitted, and subcarrier spacing used when the SS block is transmitted. The SS block is the unit including a PSS/SSS/PBCH, and may be transmitted through beam sweeping in a multi-beam-based system.

In Table 2 above, "single beam mode: blank or Tx pattern" may include information for indicating the transmission pattern of the reference signal transmitted by the TRP operating in the single beam mode. In some embodiments, "single beam mode: blank or Tx pattern" may be blank. Further, in Table 2 above, "multi beam mode: sweeping duration" may include information for indicating the time (that is, beam sweeping duration time) required for beam sweeping of the reference signal transmitted by the TRP operating in the multi-beam mode.

The reference signal configuration may be transmitted in various forms. In some embodiments, the reference signal configuration may be included in broadcast information transmitted from the TRP 410. For example, the reference signal configuration may be included in a Master Information Block (MIB). In some embodiments, the reference signal configuration may be included in common control information transmitted from the TRP 410. For example, the reference signal configuration may be included in a System Information Block (SIB). In some embodiments, the reference signal configuration may be included in UE-specific control information transmitted from the TRP 410. In some embodiments, the reference signal configuration may be included in a Radio Resource Control (RRC) message transmitted from the TRP 410. For example, the reference signal configuration may be included in the RRC message transmitted in response to switching of the beam mode of the TRP 410. In some embodiments, the RRC message may include common information for UEs. In some embodiments, the RRC message may include information dedicated for a specific UE. In some embodiments, the RRC message may include both the common information for UEs and the information dedicated for the specific UE.

In step S420, the TRP 410 may transmit the reference signal through beam sweeping. The reference signal of the TRP 410 may be a signal used for measurement of UEs located within the coverage of the TRP 410. In some embodiments, the reference signal of the TRP 410 may be referred to as a Measurement Reference Signal (MRS). The UE 420 may identify that the reference signal of the TRP 410 is transmitted through beam sweeping based on the reference signal configuration received in step S410. Since the UE 420 operates in the state in which the transmission of the reference signal of the TRP 410 through beam sweeping is identified, the UE 420 may normally receive the reference signal transmitted from the TRP 410 through beam sweeping.

In step S430, the TRP 410 may transmit the reference signal without beam sweeping. The UE 420 may identify that the reference signal of the TRP 410 is transmitted without beam sweeping based on the reference signal configuration received in step S410. Since the UE 420 operates in the state in which the transmission of the reference signal of the TRP 410 without beam sweeping is identified, the UE 420 may normally receive the reference signal transmitted from the TRP 410 without beam sweeping.

In some embodiments, only one of the operation of step S420 and the operation of step S430 may be performed.

As described above, the TRP according to various embodiments of the present disclosure may transmit the reference signal configuration, and thus may inform the UEs located within the coverage of the TRP of a pattern of the reference signal transmitted from the TRP, a format of the reference signal, or whether the reference signal is transmitted through beam sweeping. Further, the UE according to various embodiments of the present disclosure may receive the reference signal configuration, so as to normally receive the reference signal transmitted from the TRP.

Figure 5:
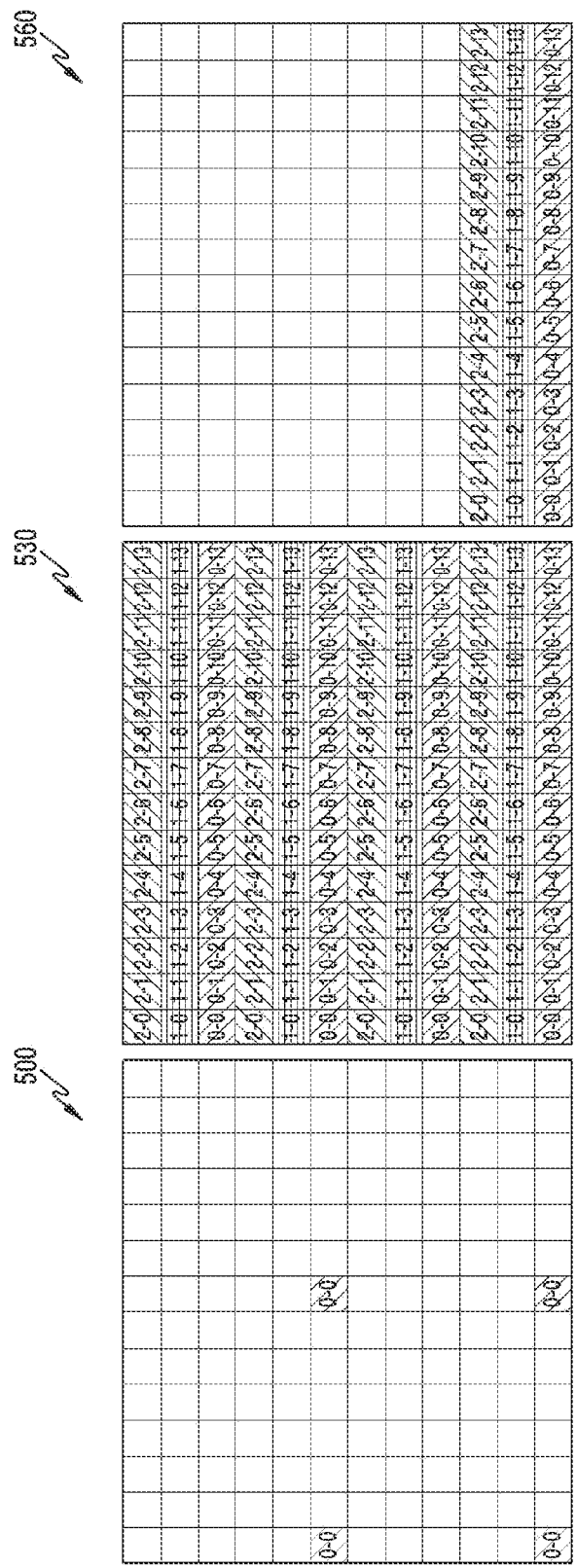
FIG. 5 illustrates an example of a transmission pattern of a reference signal according to various embodiments of the present disclosure.

FIG. 5 illustrates an example of a transmission pattern of the reference signal according to various embodiments of the present disclosure.

Referring to FIG. 5, a transmission pattern 500 refers to a pattern in which the TRP operating in the single beam mode transmits the reference signal using one antenna port. The UE according to various embodiments of the present disclosure may receive the reference signal configuration (for example, the reference signal configuration shown in Table 1) including information for indicating the transmission pattern 500, so as to identify that the TRP transmits the reference signal using the transmission pattern 500 without beam sweeping.

A transmission pattern 530 refers to a pattern in which the TRP operating in the multi-beam mode transmits the reference signal using three antenna ports on four bands through beam sweeping of 42 beams. The UE according to various embodiments of the present disclosure may receive the reference signal configuration including information for indicating the transmission pattern 530, so as to identify that the TRP transmits the reference signal using the transmission pattern 530 through beam sweeping.

A transmission pattern 560 refers to a pattern in which the TRP operating in the multi-beam mode transmits the reference signal using three antenna ports on one band through beam sweeping of 42 beams. The UE according to various embodiments of the present disclosure may receive the reference signal configuration including information for indicating the transmission pattern 560, so as to identify that the TRP transmits the reference signal using the transmission pattern 560 through beam sweeping.

According to embodiments, the transmission patterns illustrated in FIG. 5 may be indicated using one or more fields. When the reference signal configuration is set as Table 1, a value of the field "Tx pattern" of the transmission pattern 530 may have the same value of the "Tx pattern" field of the transmission pattern 560. In this case, the UE having received the reference signal configuration may distinguish between the transmission pattern 530 and the transmission pattern 560 based on a value of the filed "location in frequency domain".

Figure 6A:
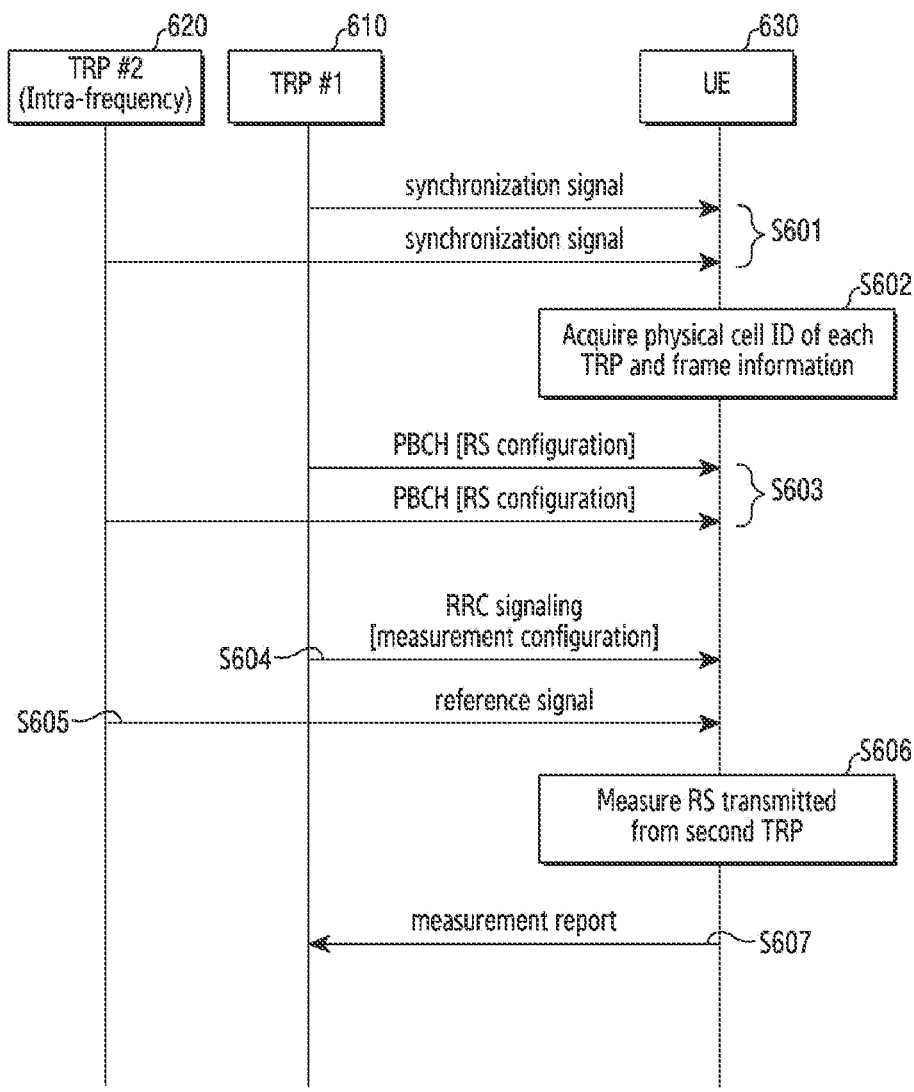
FIG. 6A illustrates an example of the signal flow between TRPs and a UE in an intra-frequency environment according to various embodiments of the present disclosure.

FIG. 6A illustrates an example of the signal flow between TRPs and a UE in an intra-frequency environment according to various embodiments of the present disclosure.

In FIG. 6A, a second TRP 620 may be a TRP pertaining to a cell having a center frequency, which corresponds to or is the same as a center frequency of a cell to which a first TRP 610 servicing a UE 630 pertains. In other words, the second TRP 620 may be a TRP set with an intra-frequency of the first TRP 610.

Referring to FIG. 6A, in step S601, the first TRP 610 and the second TRP 620 may broadcast a synchronization signal. For example, the synchronization signal may be one or more of a Primary Synchronization Signal (PSS) and a Secondary Synchronization Signal (SSS). The UE 630 may receive the synchronization signal broadcasted from the first TRP 610 and the synchronization signal broadcasted from the second TRP 620.

In step S602, the UE 630 may acquire a physical cell ID of the cell to which the first TRP 610 pertains based on the synchronization signal broadcasted from the first TRP 610. Further, the UE 630 may acquire frame information of the cell to which the first TRP 610 pertains based on the synchronization signal broadcasted from the first TRP 610. The frame information may include one or more pieces of data for synchronizing frames of the cell to which the first TRP 610 pertains, data on the type of the frame of the cell to which the first TRP 610 pertains, data on the structure of the frame of the cell to which the first TRP 610 pertains, and data on an offset of the frame of the cell to which the first TRP 610 pertains.

The UE 630 may acquire a physical cell ID of a cell to which the second TRP 620 pertains based on the synchronization signal broadcasted from the second TRP 620. Further, the UE 630 may acquire frame information of the cell to which the second TRP 620 pertains based on the synchronization signal broadcasted from the second TRP 620. The frame information may include one or more pieces of data for synchronizing frames of the cell to which the second TRP 620 pertains, data on the type of the frame of the cell to which the second TRP 620 pertains, data on the structure of the frame of the cell to which the second TRP 620 pertains, and data on an offset of the frame of the cell to which the second TRP 620 pertains.

In step S603, one or more of the first TRP 610 and the second TRP 620 may transmit a broadcast signal including the reference signal configuration. For example, the first TRP 610 may broadcast a Physical Broadcast Channel (PBCH) including the reference signal configuration of the TRP 610, and the second TRP 620 may broadcast a PBCH including the reference signal configuration of the second TRP 620.

The reference signal configuration of the first TRP 610 may include information for indicating whether the reference signal from the first TRP 610 is transmitted through beam sweeping. Further, the reference signal configuration of the first TRP 610 may also include information for indicating a pattern of the reference signal transmitted from the first TRP 610. In addition, the reference signal configuration of the first TRP 610 may also include information for indicating a time required for receiving the reference signal from the first TRP 610.

The reference signal configuration of the second TRP 620 may include information for indicating whether the reference signal from the second TRP 620 is transmitted through beam sweeping. Further, the reference signal configuration of the second TRP 620 may also include information for indicating a pattern of the reference signal transmitted from the second TRP 620. In addition, the reference signal configuration of the second TRP 620 may also include information for indicating a time required for receiving the reference signal from the second TRP 620.

Although not illustrated in FIG. 6A, the UE 630 may select the cell to which the first TRP 610 pertains as a serving cell.

In step S604, the first TRP 610 may transmit the measurement configuration to the UE 630. For example, the first TRP 610 may transmit an RRC message including the measurement configuration to the UE 630. The RRC message may be a message designated for the UE 630. The measurement configuration may include information for performing the measurement on the second TRP 620. For example, the measurement configuration may include one or more pieces of data on a physical cell ID of the cell to which the second TRP 620 pertains, data on an offset of the cell to which the second TRP 620 pertains, and data on a condition under which a measurement report on the second TRP 620 is transmitted. For example, the first TRP 610 may transmit the measurement configuration to the UE 630 in order to help in a handover of the UE 630.

In step S605, the UE 630 may receive the reference signal from the second TRP 620. Since the UE 630 has received the reference signal configuration of the second TRP 620 in step S603, the UE 630 may identify a pattern of the reference signal transmitted from the second TRP 620, a format of the reference signal transmitted from the second TRP 620, and whether the reference signal of the second TRP 620 is transmitted through beam sweeping. Accordingly, the UE 630 may normally receive the reference signal from the second TRP 620.

In step S606, the UE 630 may perform the measurement based on the received reference signal of the second TRP 620. In other words, the UE 630 may measure the current state of the channel between the second TRP 620 and the UE 630. For example, the UE 630 may measure Reference Signal Received Power (RSRP) of the reference signal of the second TRP 620. In another example, the UE 630 may measure a Received Signal Strength Indicator (RSSI) of the reference signal of the second TRP 620. In another example, the UE 630 may measure a Reference Signal Received Quality (RSRQ) of the reference signal of the second TRP 620.

In step S607, the UE 630 may transmit a measurement report containing a result of the measurement for the second TRP 620 to the first TRP 610. The measurement report may be information for indicating whether the UE 630 needs the handover. In other words, the measurement report may be information for indicating whether to perform the handover by the UE 630.

As described above, the TRP according to various embodiments of the present disclosure may help in the measurement of the UE according to various embodiments of the present disclosure by broadcasting, as common control information (or system information), the reference signal configuration including one or more pieces of information on a pattern of the transmitted reference signal, information for indicating whether the reference signal is transmitted through beam sweeping, information for indicating a beam sweeping duration time of the transmitted reference signal, information for indicating a time required for receiving the reference signal, and information on a format of the transmitted reference signal. Further, the UE according to various embodiments of the present disclosure may receive the reference signal configuration, and thus transmit the measurement report appropriately reflecting the current state of the channel between the UE and the TRP to the TRP. In other words, the UE may perform the proper measurement on the channel state in an environment in which TRPs operating in various beam modes coexist.

Figure 6B:
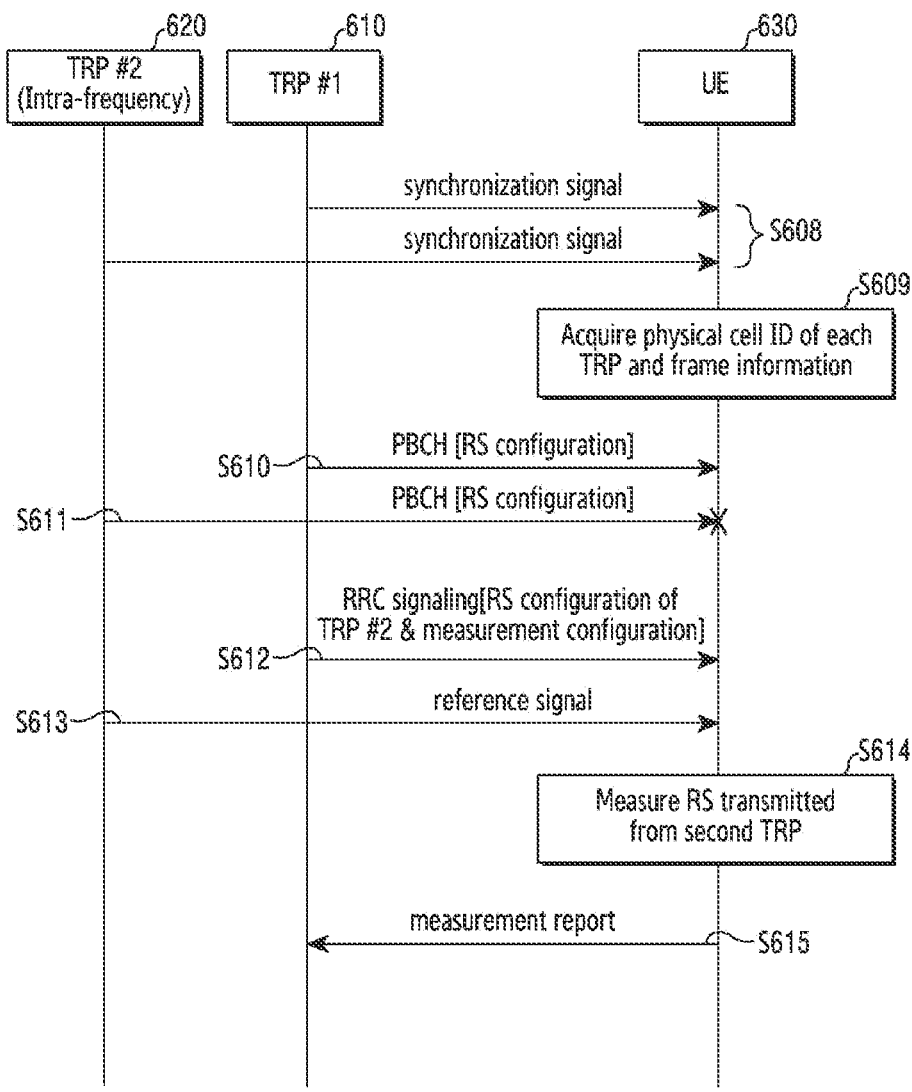
FIG. 6B illustrates another example of the signal flow between the TRPs and the UE in the intra-frequency environment according to various embodiments of the present disclosure.

FIG. 6B illustrates another example of the signal flow between the TRPs and the UE in the intra-frequency environment according to various embodiments of the present disclosure.

Referring to FIG. 6B, in step S608, the first TRP 610 and the second TRP 620 may broadcast the synchronization signal. The UE 630 may receive the synchronization signal broadcasted from the first TRP 610 and the synchronization signal broadcasted from the second TRP 620.

In step S609, the UE 630 may acquire a physical cell ID of the first TRP 610 and frame information of the first TRP 610 based on the synchronization signal broadcasted from the first TRP 610. Further, the UE 630 may acquire a physical cell ID of the second TRP 620 and frame information of the second TRP 620 based on the synchronization signal broadcasted from the second TRP 620.

In step S610, the first TRP 610 may transmit a broadcast signal including the reference signal configuration of the first TRP 610. For example, the first TRP 610 may transmit a PBCH including the reference signal configuration of the first TRP 610. The UE 630 may normally receive the PBCH including the reference signal configuration of the first TRP 610. The UE 630 may determine (or identify) one or more of a format of the reference signal of the first TRP 610, a pattern of the reference signal of the first TRP 610, and whether the reference signal of the first TRP 610 is transmitted through beam sweeping based on the reference signal configuration of the first TRP 610.

In step S611, the second TRP 620 may transmit a broadcast signal including the reference signal configuration of the second TRP 620. For example, the second TRP 620 may transmit a PBCH including the reference signal configuration of the second TRP 620. Since the PBCH including the reference signal configuration of the second TRP 620 is not a signal explicitly designated (or dedicated) for the UE 630, the UE 630 may not normally receive the reference signal configuration of the second TRP 620. For example, when the state of the channel between the second TRP 620 and the UE 630 is not good, the UE 630 may not normally receive the broadcast signal including the reference signal configuration of the second TRP 620 transmitted from the second TRP 620. In other words, the UE 630 does not normally receive the reference signal configuration of the second TRP 620, and thus may not identify the pattern of the reference signal of the second TRP 620, the pattern of the reference signal of the second TRP 620, or whether the reference signal of the second TRP 620 is transmitted through beam sweeping through the reference signal configuration of the second TRP 620.

In step S612, the first TRP 610 may transmit an RRC message containing the reference signal configuration of the second TRP 620 and the measurement configuration targeting the second TRP 620 to the UE 630. The reference signal configuration of the second TRP 620 may be the reference signal configuration of the cell to which the second TRP 620 pertains. The RRC message may be used for explicitly transmitting the reference signal configuration of the second TRP 620. Further, the RRC message may be used for explicitly transmitting the measurement configuration to the UE 630. In addition, the RRC message may be a message dedicated for the UE 630. In other words, the RRC message may be a message designated for the UE 630. The reference signal configuration of the second TRP 620 may include one or more pieces of information on the pattern of the second TRP 620, information on the format of the second TRP 620, and whether the reference signal of the second TRP 620 is transmitted through beam sweeping. The measurement configuration may include information for performing the measurement on the second TRP 620. In some embodiments, the reference signal configuration and the measurement configuration of the second TRP 620 may be transmitted through separate messages. For example, after transmitting the RRC message containing the reference signal configuration of the second TRP 620, the first TRP 610 may transmit the RRC message containing the measurement configuration targeting the second TRP 620. The reference signal configuration may include the parameters described through FIG. 4. The measurement configuration in the present document may include the parameters described through FIG. 3B.

In step S613, the second TRP 620 may transmit the reference signal of the second TRP 620. For example, the second TRP 620 may broadcast the reference signal of the second TRP 620. The UE 630 may normally receive the reference signal of the second TRP 620. Since the UE 630 is aware of the pattern of the reference signal of the second TRP 620, whether the reference signal of the second TRP 620 is transmitted through beam sweeping, or the format of the reference signal of the second TRP 620 based on the RRC message received in step S612, the UE 630 may normally receive the reference signal from the second TRP 620.

In step S614, the UE 630 may perform the measurement on the reference signal transmitted from the second TRP 620. The UE 630 may perform the measurement on the second TRP 620 based on the reference signal normally received from the second TRP 620. In other words, the UE 630 may measure the state of the channel between the second TRP 620 and the UE 630.

In step S615, the UE 630 may transmit a measurement report containing a result of the measurement for the reference signal of the second TRP 620 to the first TRP 610. The measurement report may be used by the first TRP 610 to determine whether the UE 630 needs a handover to the second TRP 620.

As described above, the TRP according to various embodiments of the present disclosure may transmit the RRC message containing the reference signal configuration of a neighboring TRP, and thus compensate for the situation in which the UE located within the coverage of the TRP cannot normally receive the reference signal configuration of the neighboring TRP broadcasted by the neighboring TRP. Further, the TRP according to various embodiments of the present disclosure may transmit the message containing the reference signal configuration of the neighboring TRP, so as to help in the handover of the UE located within the coverage of the TRP. The UE may be guaranteed mobility for the handover by receiving the message containing the reference signal configuration of the neighboring TRP.

Figure 6C:
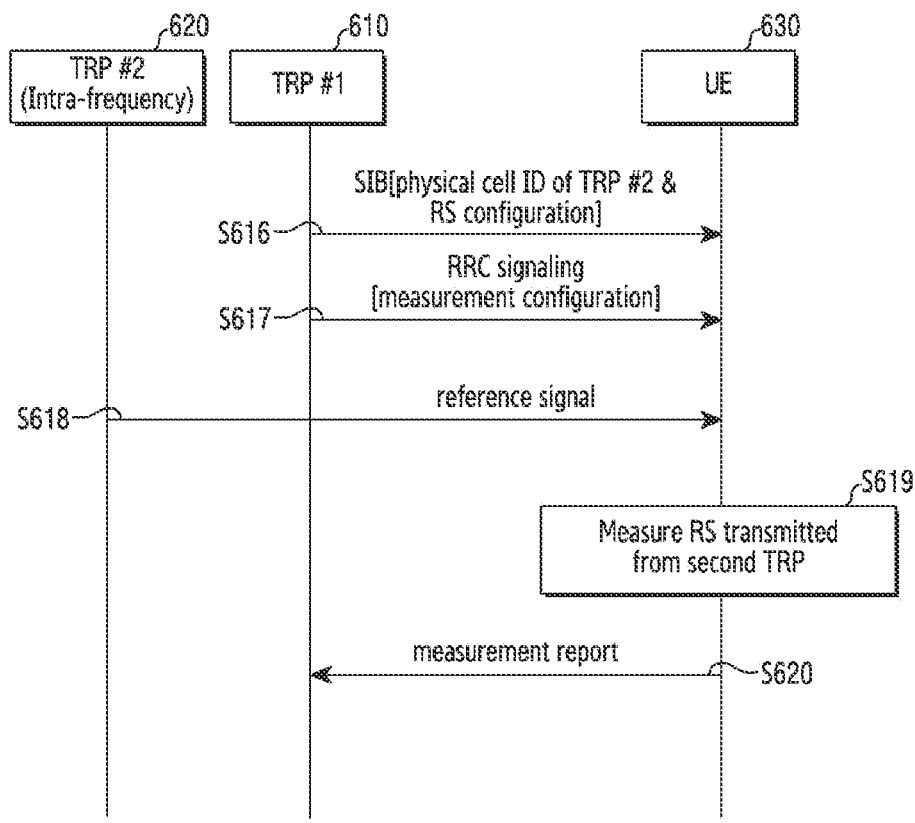
FIG. 6C illustrates still another example of the signal flow between the TRPs and the UE in the intra-frequency environment according to various embodiments of the present disclosure.

FIG. 6C illustrates still another example of the signal flow between the TRPs and the UE in the intra-frequency environment according to various embodiments of the present disclosure.

Referring to FIG. 6C, in step S616, the first TRP 610 may transmit a System Information Block (SIB) including the physical cell ID of the second TRP 620 and the reference signal configuration of the second TRP 620 to the UE 630. The system information block may be transmitted through a downlink control channel of the first TRP 610. For example, the system information block may be transmitted from the first TRP 610 through a Physical Downlink Shared Channel (PDSCH). The system information block may be a message having UE-common characteristics or attributes. The UE 630 may identify the pattern of the reference signal of the second TRP 620, the format of the reference signal of the second TRP 620, or whether the reference signal of the second TRP 620 is transmitted through beam sweeping based on the physical cell ID of the second TRP 620 and the reference signal configuration of the second TRP 620.

In step S617, the first TRP 610 may transmit the measurement configuration targeting the second TRP 620 to the UE 630. In order to identify whether the UE 630 needs the handover to the second TRP 620, the first TRP 610 may transmit the measurement configuration targeting the second TRP 620. In some embodiments, the measurement configuration may be contained in the RRC message that the first TRP 610 transmits to the UE 630.

In step S618, the second TRP 620 may broadcast the reference signal. The UE 630 may receive the reference signal broadcasted or transmitted from the second TRP 620. Since the UE 630 has received the reference signal configuration of the second TRP 620 from the first TRP 610, the UE 630 may normally receive the reference signal broadcasted or transmitted from the second TRP 620.

In step S619, the UE 630 may perform the measurement on the reference signal of the second TRP 620. In order to acquire the state of the channel between the UE 630 and the second TRP 620, the UE 630 may perform the measurement on the reference signal of the second TRP 620. For example, the UE 630 may perform the measurement on the reference signal of the second TRP 620 to determine whether the UE 630 needs the handover to the second TRP 620.

In step S620, the UE 630 may transmit a measurement report to the first TRP 610 to report a result of the measurement performed in step S619. The measurement report may be used by the first TRP 610 to determine whether the UE is handed over to the second TRP 620. When a condition defined by the measurement configuration is satisfied, the measurement report may be transmitted to the first TRP 610 from the UE 630.

As described above, the TRP according to various embodiments of the present disclosure may transmit the system information block including the reference signal configuration of the neighboring TRP and the physical cell ID of the neighboring TRP, and thus help the UE located within the coverage of the TRP in normally receiving the reference signal of the neighboring TRP even after the RRC connection. In other words, the TRP may guarantee mobility of the UE by transmitting the message having UE-common attributes with the reference signal configuration of the neighboring TRP and the physical cell ID of the neighboring TRP. Further, the UE according to various embodiments of the present disclosure may normally perform the measurement on the reference signal transmitted from the neighboring TRP by receiving the reference signal configuration of the neighboring TRP and the physical cell ID of the neighboring TRP. In addition, the UE may secure mobility of the UE through the measurement.

Figure 6D:
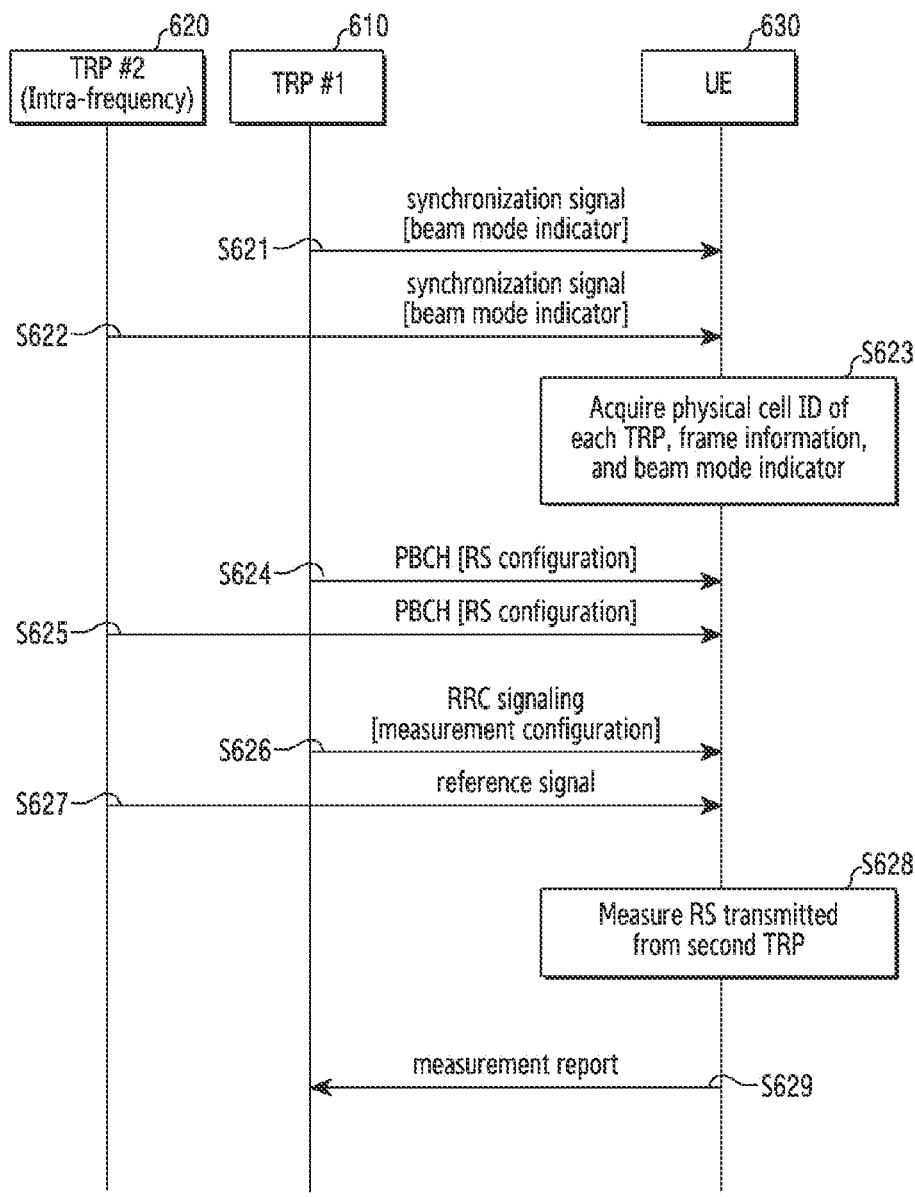
FIG. 6D illustrates yet another example of the signal flow between the TRPs and the UE in the intra-frequency environment according to various embodiments of the present disclosure.

FIG. 6D illustrates yet another example of the signal flow between the TRPs and the UE in the intra-frequency environment according to various embodiments of the present disclosure.

Referring to FIG. 6D, in step S621, the first TRP 610 may broadcast a synchronization signal including a beam mode indicator of the first TRP 610. The beam mode indicator of the first TRP 610 may include data for indicating the beam mode of the first TRP 610. For example, the beam mode indicator of the first TRP 610 may include data for indicating that the beam mode of the first TRP 610 is the single beam mode. In another example, the beam mode indicator of the first TRP 610 may include data for indicating that the beam mode of the first TRP 610 is the multi-beam mode. The UE 630 may receive the synchronization signal including the beam mode indicator of the first TRP 610 from the first TRP 610.

In step S622, the second TRP 620 may broadcast the synchronization signal including a beam mode indicator of the second TRP 620. For example, the second TRP 620 may broadcast the synchronization signal including data for indicating that the beam mode of the second TRP 620 is the single beam mode. In another example, the beam mode indicator may broadcast the synchronization signal including data for indicating that the beam mode of the second TRP 620 is the multi-beam mode. The UE 630 may receive the synchronization signal including the beam mode indicator of the second TRP 620 from the second TRP 620.

In step S623, the UE 630 may acquire the physical cell ID of the first TRP 610, frame information of the first TRP 610, and the beam mode indicator of the first TRP 610 based on the synchronization signal broadcasted from the first TRP 610, and acquire the physical cell ID of the second TRP 620, frame information of the second TRP 620, and the beam mode indicator of the second TRP 620 based on the synchronization signal broadcasted from the second TRP 620. The UE 630 may identify whether the reference signal of the first TRP 610 is transmitted through beam sweeping based on the beam mode indicator of the first TRP 610 and identify whether the reference signal of the second TRP 620 is transmitted through beam sweeping based on the beam mode indicator of second TRP 620.

In step S624, the UE 630 may receive a broadcast signal including the reference signal configuration of the first TRP 610 from the first TRP 610. For example, when the first TRP 610 operates in the multi-beam mode or the beam mode indicator included in the synchronization signal broadcasted by the first TRP 610 indicates the multi-beam mode, the reference signal configuration of the first TRP 610 may include all or some of the information shown in Table 3 below.

TABLE 3 number of antenna port for transmission of reference signal
Tx periodicity of reference signal
sweeping duration
offset
Tx pattern
location in frequency domain In Table 3 above, "number of antenna ports for transmission of reference signal" may include data for indicating the number of antenna ports used for transmitting the reference signal of the first TRP 610, "Tx periodicity of reference signal" may include data for indicating transmission periodicity of the reference signal of the first TRP 610, "sweeping duration" may include data for indicating a time required for beam sweeping of the reference signal of the first TRP 610, "offset" may include data for indicating a reference position at which the reference signal of the first TRP 610 is transmitted, "Tx pattern" may include data for indicating a transmission pattern of the reference signal of the first TRP 610, and "location in frequency domain" may include data for indicating a position (or bandwidth) in the frequency domain at which the reference signal of the first TRP 610 is transmitted.

In another example, when the first TRP 610 operates in the single beam mode or the beam mode indicator included in the synchronization signal broadcasted by the first TRP 610 indicates the single beam mode, the reference signal configuration of the first TRP 610 may include all or some of the information shown in Table 4 below.

TABLE 4 number of antenna port for transmission of reference signal
Tx periodicity of reference signal
offset
Tx pattern
location in frequency domain In Table 4 above, "number of antenna ports for transmission of reference signal" may include data for indicating the number of antenna ports used for transmitting the reference signal of the first TRP 610, "Tx periodicity of reference signal" may include data for indicating transmission periodicity of the reference signal of the first TRP 610, "offset" may include data for indicating a reference position at which the reference signal of the first TRP 610 is transmitted, "Tx pattern" may include data for indicating a transmission pattern of the reference signal of the first TRP 610, and "location in frequency domain" may include data for indicating a position (or bandwidth) in the frequency domain at which the reference signal of the first TRP 610 is transmitted. The UE 630 may normally receive the broadcast signal including the reference signal configuration of the first TRP 610. In other words, the UE 630 may acquire information on the reference signal of the first TRP 610 based on the received broadcast signal.

In step S625, the second TRP 620 may broadcast the broadcast signal including the reference signal configuration of the second TRP 620. For example, the second TRP 620 may transmit a PBCH including the reference signal configuration of the second TRP 620. The reference signal configuration of the second TRP 620 may be performed as shown in Table 3 or Table 4 above. The UE 630 may normally receive the broadcast signal including the reference signal configuration of the second TRP 620. In other words, the UE 630 may acquire information on the reference signal of the second TRP 620 based on the received broadcast signal.

In step S626, the first TRP 610 may transmit an RRC message containing the measurement configuration targeting the second TRP 620 to the UE 630. The UE 630 may receive the RRC message containing the measurement configuration.

In step S627, the second TRP 620 may broadcast the reference signal. The UE 630 may normally receive the reference signal of the second TRP 620 broadcasted from the second TRP 620 based on the measurement configuration and the reference signal configuration of the second TRP 620.

In step S628, the UE 630 may perform the measurement on the received reference signal of the second TRP 620.

In step S629, the UE 630 may transmit a measurement report containing a result of the measurement for the reference signal of the second TRP 620 to the first TRP 610. In some embodiments, the measurement report may be transmitted through the RRC message. In some embodiments, the measurement report may be included in uplink data.

As described above, the TRP according to various embodiments of the present disclosure may broadcast the synchronization signal including a beam mode indicator for indicating its own beam mode. The UE having received the synchronization signal may acquire information on the beam mode of the TRP as well as the physical cell ID of the TRP and frame information of the TRP. The UE may identify whether the reference signal transmitted from the TRP is transmitted through beam sweeping based on the beam mode indicator and the reference signal configuration included in the broadcast signal transmitted from the TRP. Further, the UE may identify the pattern of the reference signal transmitted from the TRP based on the beam mode indicator and the reference signal configuration included in the broadcast signal transmitted from the TRP.

Figure 6E:
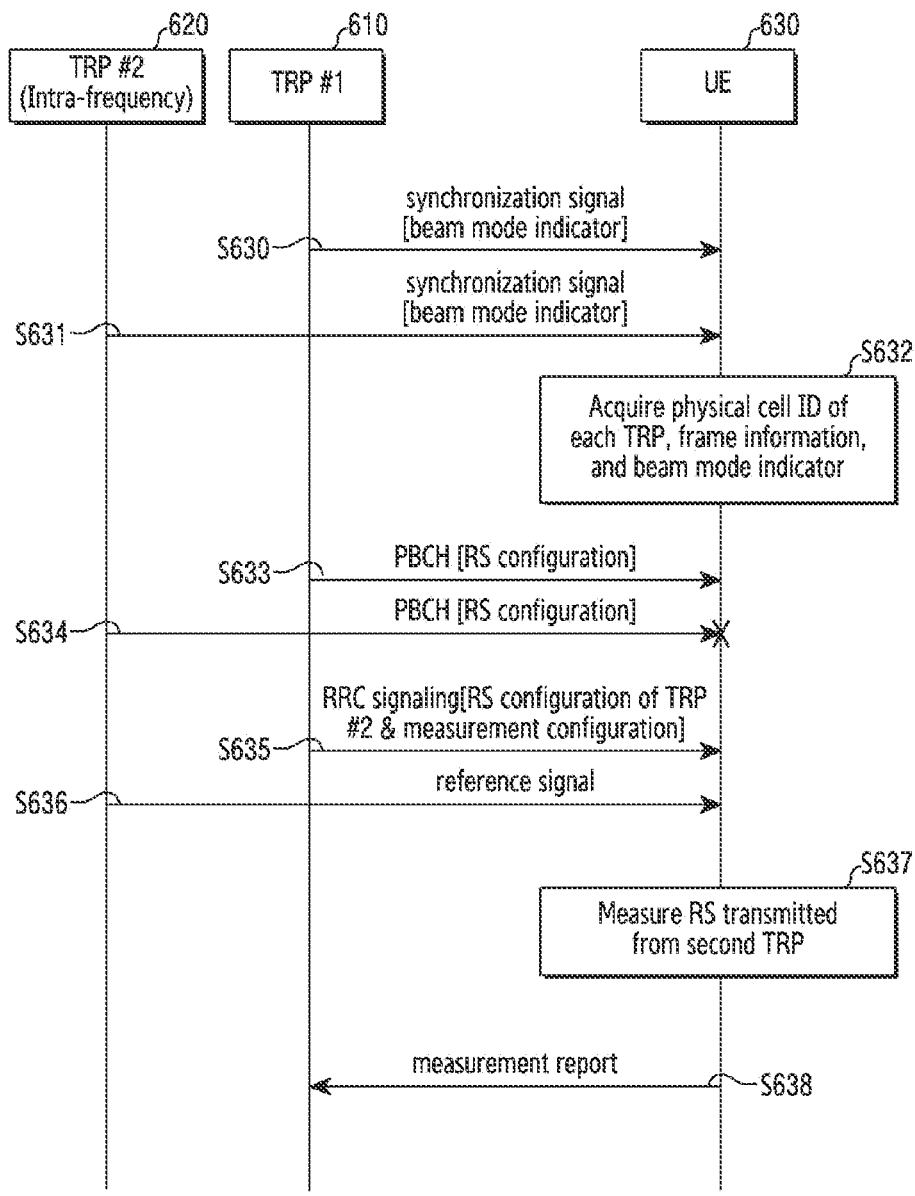
FIG. 6E illustrates still yet another example of the signal flow between the TRPs and the UE in the intra-frequency environment according to various embodiments of the present disclosure.

FIG. 6E illustrates still yet another example of the signal flow between the TRPs and the UE in the intra-frequency environment according to various embodiments of the present disclosure.

In FIG. 6E, step S630, step S631, and step S632 may correspond to step S621, step S622, and step S623, respectively.

Referring to FIG. 6E, in step S633, the first TRP 610 may transmit a broadcast signal (for example, a PBCH) including the reference signal configuration of the first TRP 610. The UE 630 may normally receive the broadcast signal including the reference signal configuration of the first TRP 610.

In step S634, the second TRP 620 may transmit a broadcast signal (for example, a PBCH) including the reference signal configuration of the second TRP 620. Since the broadcast signal including the reference signal configuration of the second TRP 620 is not a signal explicitly designated or allocated for the UE 630, the UE 630 may not normally receive the reference signal configuration of the second TRP 620. For example, when the state of the channel between the second TRP 620 and the UE 630 is not good, the UE 630 may not normally receive the broadcast signal including the reference signal configuration of the second TRP 620. In other words, the UE 630 may not identify (or acquire) information on the reference signal of the second TRP 620 (the pattern of the reference signal of the second TRP 620 and whether the reference signal of the second TRP 620 is transmitted through beam sweeping).

In step S635, in order to cover the case in which the UE 630 does not acquire the information on the reference signal of the second TRP 620, the first TRP 610 may transmit an RRC message containing the reference signal configuration of the second TRP and the measurement configuration targeting the second TRP to the UE 630. The RRC message may be a message used for explicitly indicating the reference signal configuration of the second TRP 620 to the UE 630. Further, the RRC message may be a message used for explicitly indicating the measurement configuration to the UE 630. The UE 630 may receive the RRC message containing the reference signal configuration of the second TRP 620 transmitted from the first TRP 610 and the measurement configuration targeting the second TRP 620. The UE 630 may acquire information on the reference signal configuration of the second TRP 620 and information on the measurement configuration targeting the second TRP 620 by receiving the RRC message.

In step S636, the second TRP 620 may broadcast the reference signal of the second TRP 620. The UE 630 may normally receive the reference signal of the second TRP 620 based on the reference signal configuration of the second TRP 620 and the measurement configuration targeting the second TRP 620.

In step S637, the UE 630 may perform the measurement on the reference signal transmitted from the second TRP 620. For example, the UE 630 may perform the measurement on the reference signal of the second TRP 620 for the handover to the second TRP 620. In other words, the UE 630 may generate information for indicating the state of the channel between the second TRP 620 and the UE 630 based on the reference signal of the second TRP 620.

In step S638, the UE 630 may transmit a measurement report containing the information for indicating the state of the channel between the second TRP 620 and the UE 630 to the first TRP 610. The first TRP 610 may receive the measurement report from the UE 630. Based on the received measurement report, the first TRP 610 may acquire the state of the channel between the second TRP 620 and the UE 630. The acquired state of the channel may be used for determining whether the UE 630 needs the handover to the second TRP 620.

Figure 7A:
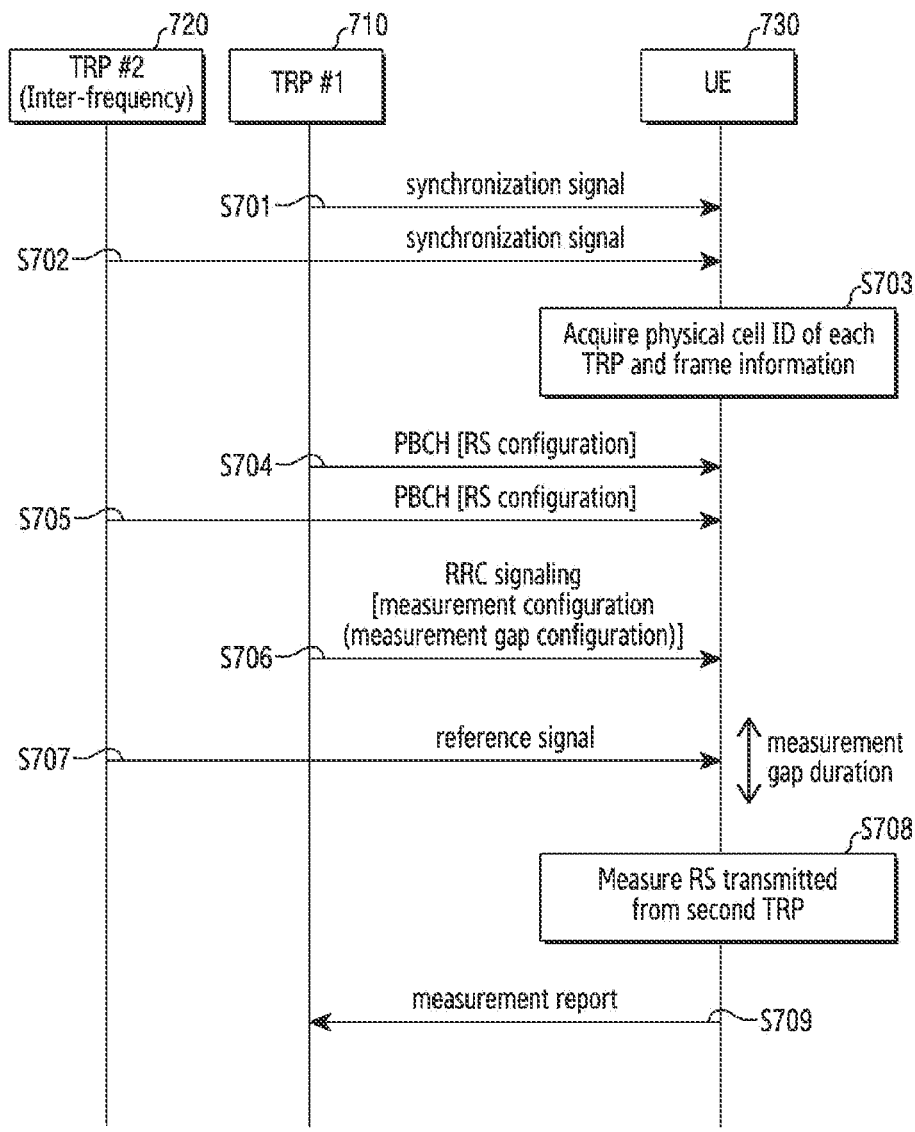
FIG. 7A illustrates an example of the signal flow between TRPs and a UE in an inter-frequency environment according to various embodiments of the present disclosure.

FIG. 7A illustrates an example of the signal flow between TRPs and a UE in an inter-frequency environment according to various embodiments of the present disclosure.

In FIG. 7A, a second TRP 720 may be a TRP pertaining in a cell having a center frequency different from a center frequency of a cell to which a first TRP 710 servicing a UE 730 pertains. In other words, the second TRP 720 may be a TRP having an inter-frequency of the first TRP 710.

Referring to FIG. 7A, in step S701, the first TRP 710 may broadcast a synchronization signal. The UE 730 may receive the synchronization signal from the first TRP 710. In step S702, the second TRP 720 may broadcast a synchronization signal. The UE 730 may receive the synchronization signal from the first TRP 710.

In step S703, the UE 730 may acquire (or identify) a physical cell ID of the first TRP 710 and frame information of the first TRP 710 based on the synchronization signal transmitted from the first TRP 710. Further, the UE 730 may acquire a physical cell ID of the second TRP 720 and frame information of the second TRP 720 based on the synchronization signal transmitted from the second TRP 720.

In step S704, the first TRP 710 may transmit or broadcast a broadcast signal (for example, a PBCH) containing a reference signal configuration of the first TRP 710. The UE 730 may normally receive the broadcast signal including the reference signal configuration of the first TRP 710.

In step S705, the second TRP 720 may transmit or broadcast a broadcast signal containing a reference signal configuration of the second TRP 720. The UE 730 may normally receive the broadcast signal including the reference signal configuration of the second TRP 720.

Although not illustrated in FIG. 7A, the UE 730 may select the cell to which the first TRP 710 pertains as a serving cell.

In step S706, the first TRP 710 may transmit an RRC message containing a measurement configuration including a measurement gap configuration for the second TRP 720 to the UE 730. Since the center frequency of the cell to which the second TRP 720 pertains is different from the center frequency of the cell to which the first TRP 710 pertains, the first TRP 710 may transmit an RRC message containing a measurement configuration including a measurement gap configuration set to measure a reference signal of the second TRP 720 to the UE 730. In some embodiments, the measurement gap configuration may include a duration time (that is, measurement gap duration) required for performing the measurement on the second TRP 720. The measurement gap duration time may be determined based on a time required for receive beam sweeping of the UE 730. Further, the measurement gap duration time may be determined based on a beam mode of the second TRP 720. In addition, the measurement gap duration time may be determined based on a time required for beam sweeping of the second TRP 720.

In step S707, the second TRP 720 may transmit the reference signal. The UE 730 may specify a time point at which the reference signal of the second TRP 720 is received through the measurement configuration and specify information on the second TRP 720 through the reference signal configuration of the second TRP 720, and thus normally receive the reference signal of the second TRP 720. For example, the UE 730 may receive the reference signal for the measurement gap duration time included in the measurement gap configuration.

In step S708, the UE 730 may perform the measurement on the reference signal transmitted from the second TRP 720. In other words, the UE 730 may determine information on the state of a channel between the second TRP 720 and the UE 730.

In step S709, the UE 730 may transmit a measurement report containing the determined information on the state of the channel between the second TRP 720 and the UE 730 to the first TRP 710. The first TRP 710 may receive the measurement report from the UE 730.

As described above, the UE according to various embodiments of the present disclosure may receive the reference signal configuration of the neighboring TRP from the neighboring TRP having an inter-frequency relation and receive the measurement configuration including the measurement gap configuration to perform the measurement on the reference signal of the neighboring TRP from the serving TRP, and thus normally receive the reference signal of the neighboring TRP. Further, the UE may perform the measurement on the reference signal of the neighboring TRP in response to the reception of the reference signal of the neighboring TRP, and thus transmit the measurement report containing information on the state of the channel between the neighboring TRP and the UE to the serving TRP. Through such operations, the UE may be guarantee mobility in the environment in which TRPs having various beam modes coexist.

Figure 7B:
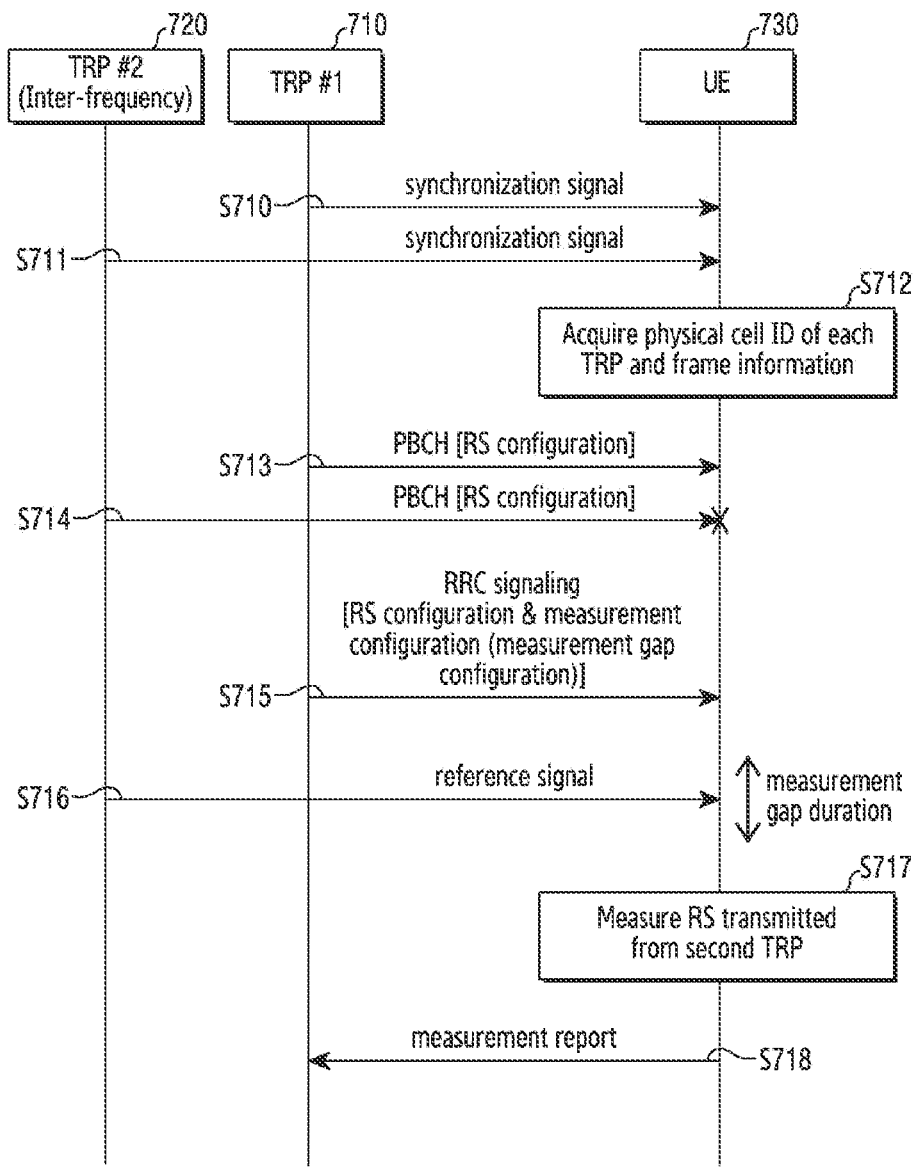
FIG. 7B illustrates another example of the signal flow between the TRPs and the UE in the inter-frequency environment according to various embodiments of the present disclosure.

FIG. 7B illustrates another example of the signal flow between the TRPs and the UE in the inter-frequency environment according to various embodiments of the present disclosure.

Step S710, step S711, step S712, and step S713 in FIG. 7B may correspond to step S701, step S702, step S703, and step S704 in FIG. 7A, respectively.

Referring to FIG. 7B, in step S714, the second TRP 720 may transmit the broadcast signal (for example, the PBCH) containing the reference signal configuration of the second TRP 720. Since the broadcast signal containing the reference signal configuration of the second TRP 720 is not a signal allocated, designated, or dedicated for the UE 730, the broadcast signal may not be normally received by the UE 730. For example, when the state of the channel between the second TRP 720 and the UE 730 is not good or when an interval between the center frequency of the cell to which the first TRP 710 pertains and the center frequency of the cell to which the second TRP 720 pertains is relatively long, the UE 730 may not normally receive the broadcast signal containing the reference signal configuration of the second TRP 720 transmitted from the second TRP 720. Since the UE 730 does not normally receive the reference signal of the second TRP 720, the UE 730 cannot identify a pattern of the reference signal of the second TRP 720 and whether the reference signal of the second TRP 720 is transmitted through beam sweeping.

In step S715, the first TRP 710 may transmit the RRC message containing the reference signal configuration of the second TRP 720 and the measurement gap configuration that targets the second TRP 720 and measures the reference signal of the second TRP 720 to the UE 730. The RRC message may contain the reference signal configuration of the second TRP in order to explicitly inform the UE 730 of the reference signal configuration of the second TRP 720. Further, the RRC message may contain the measurement configuration in order to explicitly inform the UE 730 of information for performing the measurement of the reference signal of the second TRP 720. In some embodiments, the reference signal configuration of the second TRP 720 and the measurement configuration may be transmitted through different messages. For example, after transmitting the RRC message containing the reference signal configuration of the second TRP 720, the first TRP 710 may transmit the RRC message containing the measurement configuration including the measurement gap configuration to the UE 730.

The UE 730 may receive the RRC message from the first TRP 710. The UE 730 may identify (or recognize) the pattern of the reference signal of the second TRP 720 and whether the reference signal of the second TRP 720 is transmitted through beam sweeping based on the received RRC message. Further, the UE 730 may identify (or recognize) a time point at which the reference signal of the second TRP 720 is received, duration in which the reference signal of the second TRP 720 is received, and a transmission frequency band of the reference signal of the second TRP based on the received RRC message.

In step S716, the second TRP 720 may broadcast the reference signal. The UE 730 may normally receive the reference signal based on the measurement configuration containing the measurement gap configuration and the reference signal configuration of the second TRP 720.

In step S717, the UE 730 may perform the measurement on the reference signal transmitted from the second TRP 720. In other words, the UE 730 may calculate or determine a value for indicating the state of the channel between the second TRP 720 and the UE 730 based on the reference signal of the second TRP 720.

In step S718, the UE 730 may transmit the measurement report on the reference signal of the second TRP 720 to the first TRP 710. The measurement report may be used for a handover of the UE 730.

As described above, the TRP according to various embodiments of the present disclosure may transmit the reference signal configuration of the neighboring TRP having the inter-frequency relation and the measurement configuration including the measurement gap configuration for performing the measurement on the reference signal of the neighboring TRP through RRC signaling in the inter-frequency environment, so as to secure accurate information on the state of the channel between the UE, which is within the coverage of the TRP or receives a service from the TRP, and the neighboring TRP. Further, based on the secured information, the TRP may guarantee mobility of the UE.

Figure 7C:
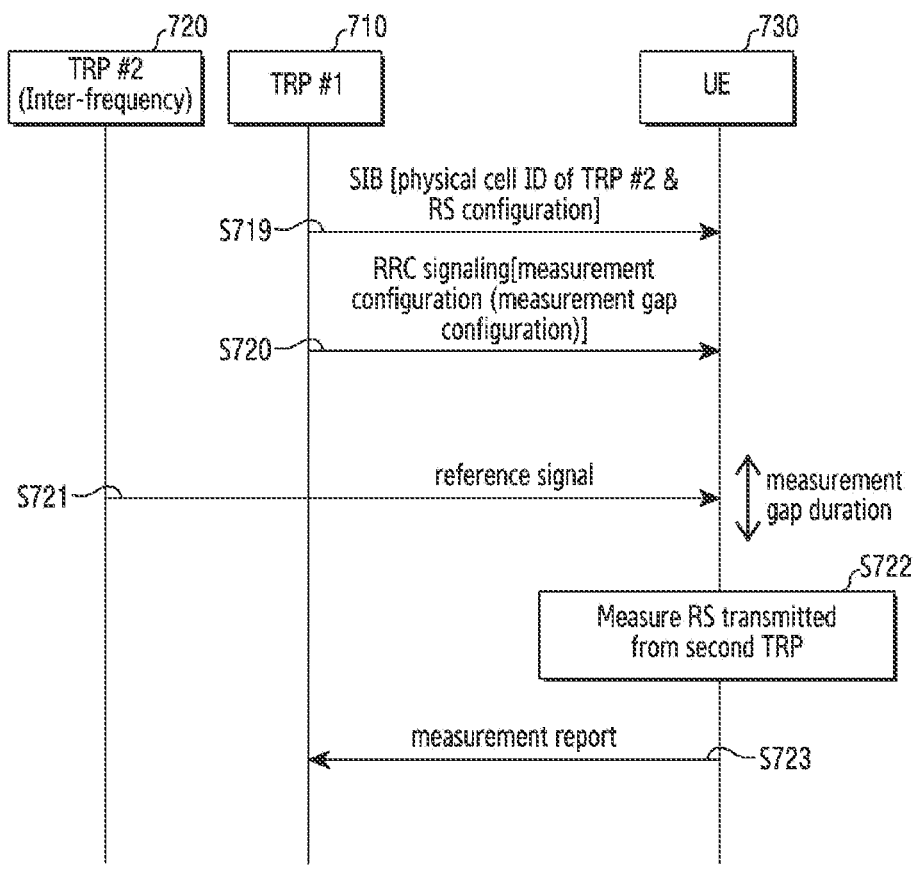
FIG. 7C illustrates still another example of the signal flow between the TRPs and the UE in the inter-frequency environment according to various embodiments of the present disclosure.

FIG. 7C illustrates still another example of the signal flow between the TRPs and the UE in the inter-frequency environment according to various embodiments of the present disclosure.

Referring to FIG. 7C, in step S719, the first TRP 710 may transmit a system information block including the physical cell ID of the second TRP 720 and the reference signal configuration of the second TRP 720 to the UE 730. The UE 730 may receive the system information block from the first TRP 710. Through the reception of the system information block, the UE 730 may acquire or identify information on the physical cell ID of the second TRP 720 included in the cell having a center frequency different from the center frequency of the cell to which the first TRP 710 pertains and information on the reference signal configuration of the second TRP 720.

In step S720, the first TRP 710 may transmit the RRC message containing the measurement configuration including the measurement gap configuration for measuring the reference signal of the second TRP 720 to the UE 730. Since the center frequency of the cell to which the second TRP 720 pertains is different from the center frequency to which the first TRP 710 pertains, the first TRP 710 may transmit the RRC message containing the measurement configuration including the measurement gap configuration to the UE 730. The UE 730 may receive the RRC message from the first TRP 710. Through the reception of the RRC message, the UE 730 may determine or identify a time point at which the measurement of the reference signal of the second TRP 720 is initiated and information on duration in which the reference signal of the second TRP 720 is received.

In step S721, the second TRP 720 may broadcast the reference signal. The UE 730 may receive the reference signal based on the reference signal configuration of the second TRP 720 and the measurement configuration targeting the second TRP and including the measurement gap configuration. For example, the UE 730 may receive the reference signal broadcasted from the second TRP 720 for the duration time (that is, the measurement gap duration time) indicated by the measurement gap configuration, starting at a time point indicated by the measurement gap configuration.

In step S722, the UE 730 may perform the measurement on the reference signal transmitted from the second TRP 720. In other words, the UE 730 may determine a value for indicating the state (or quality) of the channel between the second TRP 720 and the UE 730.

In step S723, the UE 730 may transmit the measurement report containing the value for indicating the state of the channel between the second TRP 720 and the UE 730 to the first TRP 710. In other words, the UE 730 may transmit the measurement report containing a result of the measurement for the reference signal of the second TRP 720 to the first TRP 710.

As described above, the TRP according to various embodiments of the present disclosure may transmit the reference signal configuration of the neighboring TRP having the inter-frequency through the system information block as well as the broadcast signal and the RRC message. Through such an operation, the TRP may compensate for non-reception, by the UE, of the reference signal configuration transmitted from the neighboring TRP or transmitted from the TRP through RRC signaling. Further, the UE according to various embodiments of the present disclosure may measure the reference signal of the neighboring TRP based on the reference signal configuration, and may transmit accurate information on the state of the channel between the UE and the neighboring TRP to the TRP.

Figure 7D:
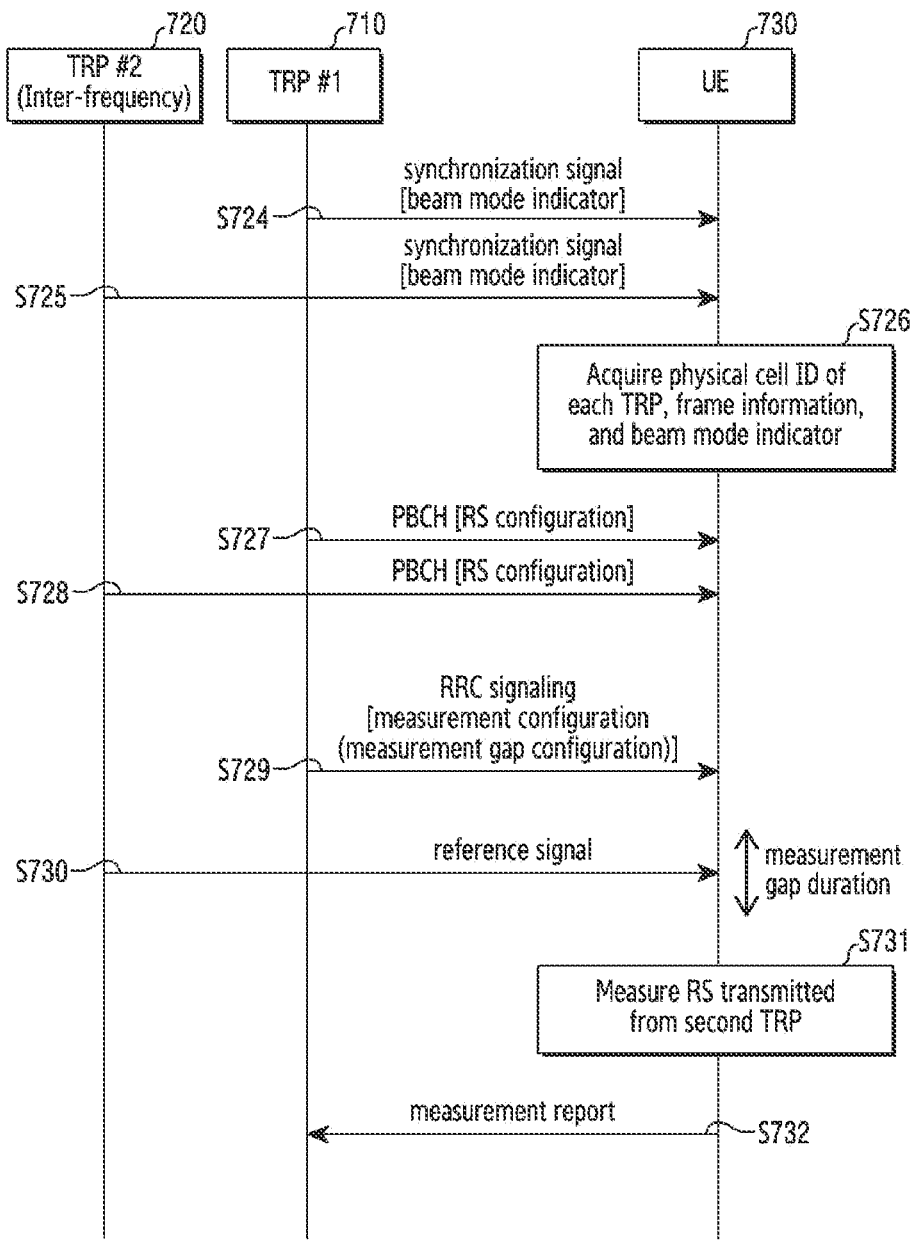
FIG. 7D illustrates still yet another example of the signal flow between the TRPs and the UE in the inter-frequency environment according to various embodiments of the present disclosure.

FIG. 7D illustrates still yet another example of the signal flow between the TRPs and the UE in the inter-frequency environment according to various embodiments of the present disclosure.

Referring to FIG. 7D, in step S724, the first TRP 710 may broadcast the synchronization signal containing a beam mode indicator of the first TRP 710. The beam mode indicator may be used for indicating the beam mode of the first TRP 710. Further, the beam mode indicator may be used for indicating whether the reference signal of the first TRP 710 is transmitted through beam sweeping. The UE 730 may receive the synchronization signal from the first TRP 710.

In step S725, the second TRP 720 may broadcast the synchronization signal containing the beam mode indicator of the second TRP 720. The UE 730 may receive the synchronization signal from the second TRP 720.

In step S726, the UE 730 may acquire or determine the physical cell ID of the first TRP 710, the frame information of the first TRP 710, and the beam mode indicator of the first TRP 710 based on the synchronization signal broadcasted from the first TRP 710. Particularly, the UE 730 may identify whether the first TRP 710 transmits the reference signal through beam sweeping by identifying the beam mode indicator of the first TRP 710.

Further, the UE 730 may acquire or determine the physical cell ID of the second TRP 720, the frame information of the second TRP 720, and the beam mode indicator of the second TRP 720 based on the synchronization signal broadcasted from the second TRP 720. Particularly, the UE 730 may identify whether the second TRP 720 transmits the reference signal through beam sweeping by identifying the beam mode indicator of the second TRP 720.

In step S727, the first TRP 710 may broadcast or transmit the broadcast signal (for example, the PBCH) containing the reference signal configuration of the first TRP 710. In some embodiments, the reference signal configuration of the first TRP 710 contained in the broadcast signal may be set based on Table 3 or Table 4 above. The UE 730 may normally receive the broadcast signal including the reference signal configuration of the first TRP 710. The UE 730 may identify whether the reference signal of the first TRP 710 is transmitted through beam sweeping based on the broadcast signal transmitted from the first TRP 710 and the synchronization signal transmitted from the first TRP 710.

In step S728, the second TRP 720 may broadcast or transmit the broadcast signal containing the reference signal configuration of the second TRP 720. In some embodiments, the reference signal configuration of the second TRP 720 contained in the broadcast signal may be set based on Table 3 or Table 4 above. The UE 730 may normally receive the broadcast signal including the reference signal configuration of the second TRP 720. The UE 730 may identify whether the reference signal of the second TRP 720 is transmitted through beam sweeping based on the broadcast signal transmitted from the second TRP 720 and the synchronization signal transmitted from the second TRP 720.

In step S729, the first TRP 710 may transmit the RRC message containing the measurement configuration including the measurement gap configuration used for measuring the reference signal of the second TRP 720 to the UE 730. In other words, the first TRP 710 may transmit the measurement configuration including the measurement gap configuration used for measuring the reference signal of the second TRP 720 to the UE 730 through RRC signaling. The UE 730 may receive the RRC message from the first TRP 710.

In step S730, the second TRP 720 may broadcast the reference signal. Since the UE has received information on the measurement gap configuration, information on the measurement configuration, and information on the reference signal configuration of the second TRP 720, the UE 730 may normally receive the reference signal broadcasted from the second TRP 720.

In step S731, the UE 730 may perform the measurement on the reference signal of the second TRP 720. The UE 730 may perform the measurement on the reference signal of the second TRP 720 in order to determine the state of the channel between the UE 730 and the second TRP 720 pertaining to the cell having the center frequency different from the center frequency of the cell to which the first TRP 710 pertains.

In step S732, the UE 730 may transmit the measurement report containing a result of the measurement determined through the measurement to the first TRP 710. The measurement report may be a message which the UE 730 transmits to the first TRP 710 for mobility of the UE 730. In some embodiments, the measurement report may be transmitted through an uplink data channel. In some embodiments, the measurement report may be transmitted through an uplink control channel.

As described above, the TRP according to various embodiments of the present disclosure may broadcast the synchronization signal containing the beam mode indicator, broadcast the broadcast signal containing the reference signal configuration of the TRP, and transmit the measurement configuration including the measurement gap configuration used for measuring the reference signal of the neighboring TRP having the center frequency different from that of the TRP, so as to determine a relation between the UE, which receives a service from the TRP, and the neighboring TRP. In other words, the TRP may determine whether the UE should perform the handover to the neighboring TRP by transmitting the above-described configurations.

Figure 7E:
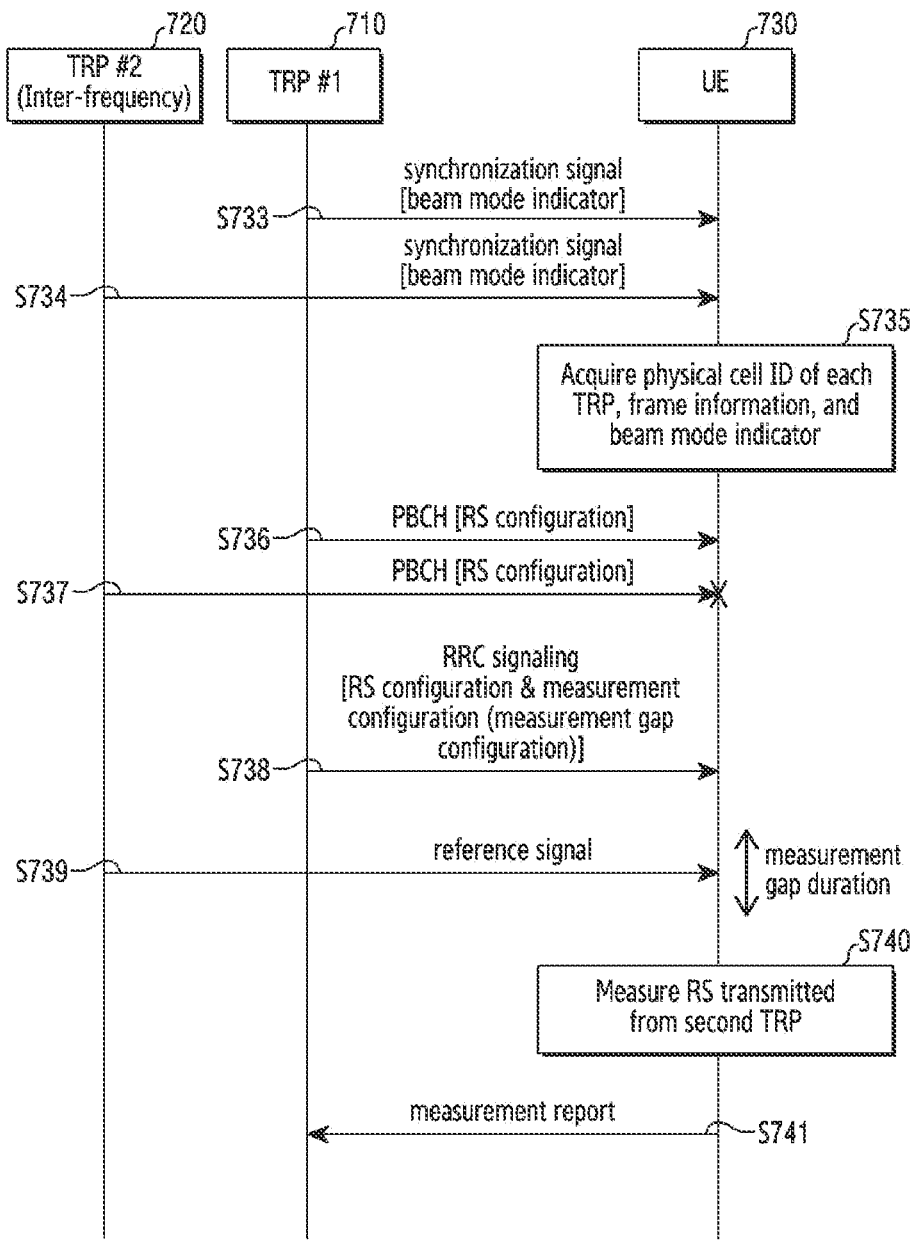
FIG. 7E illustrates further another example of the signal flow between the TRPs and the UE in the inter-frequency environment according to various embodiments of the present disclosure.

FIG. 7E illustrates further another example of the signal flow between the TRPs and the UE in the inter-frequency environment according to various embodiments of the present disclosure.

Step S733, step S734, step S735, and step S736 in FIG. 7E may correspond to step S724, step S725, step S726, and step S727 in FIG. 7D.

Referring to FIG. 7E, in step S737, the second TRP 720 may broadcast the broadcast signal (for example, the PBCH) containing the reference signal configuration of the second TRP 720. Since the center frequency of the second TRP 720 may different from the center frequency of the first TRP 710, the UE 730 may not normally receive the broadcast signal containing the reference signal configuration of the second TRP 720. For example, when a distance between the center frequency of the second TRP 720 and the center frequency of the first TRP 710 is relatively long or when the state of the channel between the second TRP 720 and the UE 730 is not good, the UE 730 may not normally receive the broadcast signal broadcasted from the second TRP 720. In other words, the UE 730 may not identify whether the reference signal of the second TRP 720 is transmitted through beam sweeping.

In step S738, the first TRP 710 may transmit the RRC message containing the reference signal configuration of the second TRP 720 and the measurement configuration including the measurement gap configuration for measuring the reference signal of the second TRP 720 to the UE 730. The UE 730 may receive the RRC message. Through the reception of the RRC message, the UE 730 may explicitly determine information on the reference signal configuration of the second TRP 720. In other words, in response to the reception of the RRC message, the UE 730 may explicitly determine the pattern of the reference signal of the second TRP 720 or whether the reference signal of the second TRP 720 is transmitted through beam sweeping.

In step 739, the second TRP 720 may broadcast or transmit the reference signal. The UE 730 may normally receive the reference signal broadcasted or transmitted from the second TRP 720 based on the measurement configuration including the measurement gap configuration and the reference signal configuration of the second TRP 720.

In step S740, the UE 730 may perform the measurement on the normally received reference signal. Since the UE 730 normally received the reference signal, the UE 730 may determine a value corresponding to the current state of the channel between the UE 730 and the second TRP 720 as a measurement result.

In step S741, the UE 730 may transmit the measurement report containing the measurement result to the first TRP 710. The first TRP 710 may receive the measurement report from the UE 730.

As described above, the TRP according to various embodiments of the present disclosure may transmit the measurement configuration including the measurement gap configuration and the reference signal configuration of another TRP through RRC signaling, thereby compensating for the case in which the broadcast signal transmitted from the other TRP is not normally received by the UE. Through the compensation, the TRP may specify the case in which the UE needs the handover due to the movement of the UE. Further, the UE according to various embodiments of the present disclosure may perform the accurate measurement on the reference signal of the other TRP based on the explicitly received reference signal configuration of the other TRP.

Figure 8:
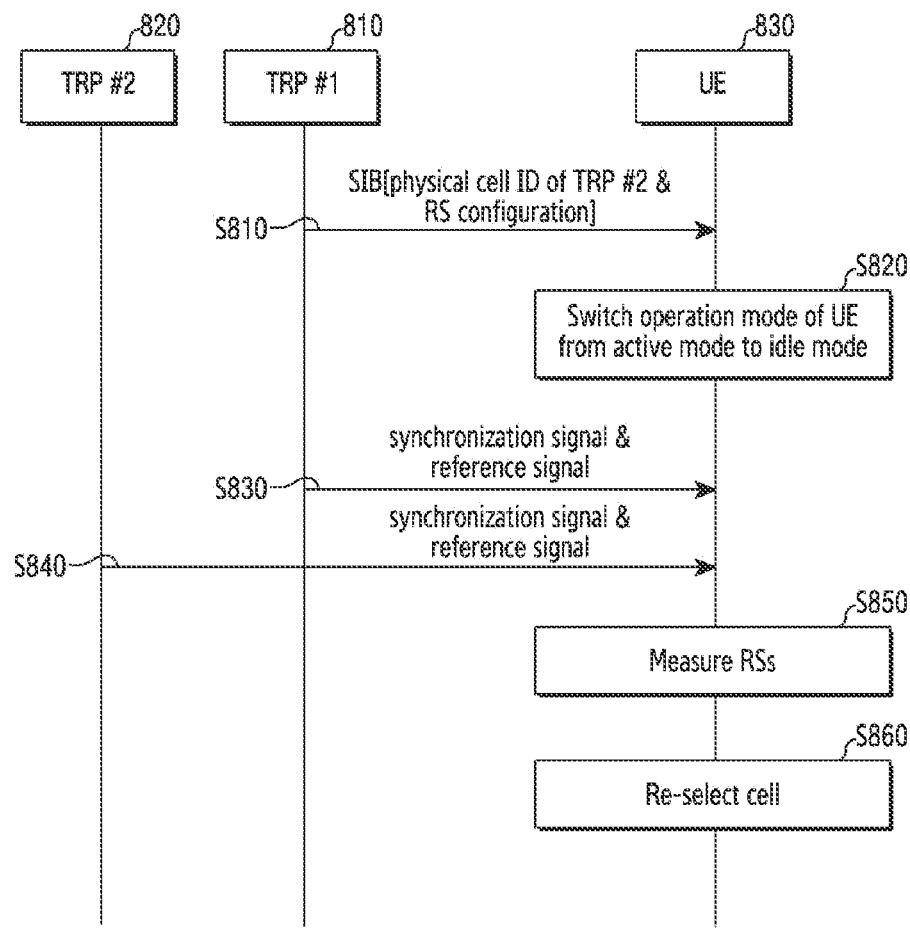
FIG. 8 illustrates an example of the signal flow between a UE performing a cell re-selection and TRPs according to various embodiments of the present disclosure.

FIG. 8 illustrates an example of the signal flow between a UE performing a cell re-selection and TRPs according to various embodiments of the present disclosure.

In FIG. 8, a second TRP 820 is a TRP different from a first TRP 810, and the first TRP 810 is a TRP which previously serviced a UE 830 before the UE 830 switches to an idle mode. Further, the UE 830 may be a UE which has received a reference signal configuration of the first TRP 810 from the first TRP 810.

Referring to FIG. 8, in step S810, the first TRP 810 may transmit a system information block including a physical cell ID of the second TRP 820 and a reference signal configuration of the second TRP 820 to the UE 830 receiving a service from the first TRP 810. The UE 830 may receive the system information block from the first TRP 810. Through the reception of the system information block, the UE 830 may acquire the physical cell ID of the second TRP 820 and the reference signal configuration of the second TRP 820.

In step S820, the UE 830 may switch from an active mode to an idle mode. For example, the UE 830 may switch from the active mode to the idle mode for a Discontinuous Reception Cycle (DRX). In another example, when it is determined that there is no traffic related to the UE 830, the UE 830 may switch from the active mode to the idle mode. In the switched idle mode, the UE 830 may move to a position different from a position in the active mode.

In step S830, the first TRP 810 may broadcast a synchronization signal and a reference signal. The UE 830 may receive the synchronization signal and the reference signal.

In step S840, the second TRP 820 may broadcast the synchronization signal and the reference signal. The UE 830 may receive the synchronization signal and the reference signal.

Based on the received synchronization signals, the UE 830 may acquire a physical cell ID of the first TRP 810 and frame information of the first TRP 810, a physical cell ID of the second TRP, and frame information of the second TRP 820.

Further, since the UE 830 has received the reference signal configuration of the first TRP 810 and the reference signal configuration of the second TRP 820 through the previous procedure or signaling, the UE 830 may normally receive the reference signal of the first TRP 810 and the reference signal of the second TRP 820.

In step S850, the UE 830 may perform the measurement on the received reference signals. Through the performed measurement, the UE 830 may determine a value for indicating the state of the channel between the UE 830 and the first TRP 810 and a value for indicating the state of the channel between the UE 830 and the second TRP 820.

In step S860, the UE 830 may perform a cell re-selection based on the determined values. The cell re-selection may be a procedure for compensating for the position of the UE 830 changed while the UE 830 switches to the idle mode. For example, when the value for indicating the state of the channel between the UE 830 and the second TRP 820 is greater than the value for indicating the state of the channel between the UE 830 and the first TRP 810, the UE 830 may re-select the cell to which the second TRP 820 pertains as a serving cell. Unlike this, when the value for indicating the state of the channel between the UE 830 and the second TRP 820 is smaller than the value for indicating the state of the channel between the UE 830 and the first TRP 810, the UE 830 may re-select the cell to which the first TRP 810 pertains as the serving cell.

As described above, the UE according to various embodiments of the present disclosure may select the cell suitable for the UE as the serving cell by performing the cell re-selection based on the measurement configuration of a plurality of TRPs acquired through signaling before the UE switches to the idle mode.

Figure 9:
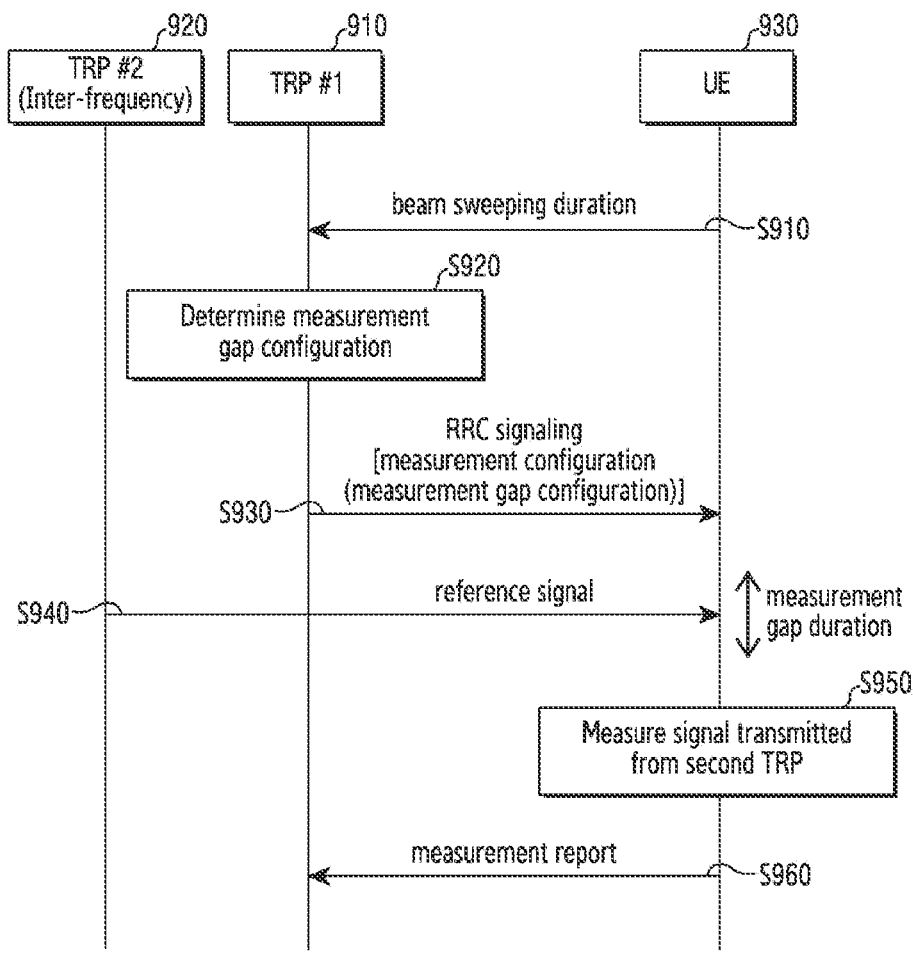
FIG. 9 illustrates another example of the signal flow between TRPs and a UE according to various embodiments of the present disclosure.

FIG. 9 illustrates another example of the signal flow between TRPs and a UE according to various embodiments of the present disclosure.

In FIG. 9, a second TRP 920 may be a TRP pertaining to a cell having a center frequency different from a center frequency of a cell to which a first TRP 910, which services a UE 930, pertains. In other words, the second TRP 920 may be a TRP having an inter-frequency of the first TRP 910.

Referring to FIG. 9, in step S910, the UE 930 may transmit information for indicating a duration time of beam sweeping of receive beams of the UE 930 to the first TRP 910. The beam sweeping of the receive beams may be the term referring to the operation for sequentially circulating the receive beams of the UE 930 to determine an optimal beam for receiving the signal transmitted from the first TRP 910.

Information for indicating the duration time of the beam sweeping of the receive beams transmitted from the UE 930 may have various formats.

In some embodiments, the information for indicating the duration time of the beam sweeping of the receive beams transmitted from the UE 930 may contain a value directly indicating the duration time of the beam sweeping of the receive beams. For example, when the duration time of the beam sweeping of the receive beams of the UE 930 is 16 ms, the information for indicating the duration time of the beam sweeping of the receive beams may include a bit sequence value "10000".

In some embodiments, the information for indicating the duration time of the beam sweeping of the receive beams transmitted from the UE 930 may be an index value indirectly indicating the duration time of the beam sweeping of the receive beams. For example, in a table for indicating the duration time of the beam sweeping of the receive beams shared between the UE 930 and the first TRP 910, when an index corresponding to a duration time 5 ms of the beam sweeping of the receive beams is "00", an index corresponding to a duration time 10 ms of the beam sweeping of the receive beams is "01", and an index corresponding to a duration time 15 ms of the beam sweeping of the receive beams is "10", an index corresponding to a duration time 20 ms of the beam sweeping of the receive beams is "11", and the duration time of the beam sweeping of the receive beams of the UE 930 is 10 ms, the information for indicating the duration time of the beam sweeping of the receive beams transmitted from the UE 930 may include a bit sequence value "01".

Further, the information for indicating the duration time of the beam sweeping of the receive beams transmitted from the UE 930 may be transmitted through various procedures.

In some embodiments, the UE 930 may transmit the information for indicating the duration time of the beam sweeping of the receive beams of the UE 930 in a random access procedure with the first TRP 910. For example, the UE 930 may transmit a random access sequence including the index for indicating the duration time of the beam sweeping of the receive beams of the UE 930 to the first TRP 910. In another example, the UE 930 may transmit a sequence corresponding to the duration time of the beam sweeping of the receive beams of the UE 930 among a plurality of random access sequences to the first TRP 910. In still another example, the UE 930 may transmit the random access sequence to the first TRP 910 at timing corresponding to the duration time of the beam sweeping of the receive beams of the UE 930 among a plurality of timings for transmitting the random access sequence.

In some embodiments, the UE 930 may transmit capability information of the UE 930 containing the information for indicating the duration time of the beam sweeping of the receive beams of the UE 930 to the first TRP 910.

In step S920, the first TRP 910 may determine the measurement gap configuration based on the received duration time of the beam sweeping of the receive beams of the UE 930. The first TRP 910 may determine the measurement gap duration time for performing the measurement on the second TRP 920 based on the duration time of the beam sweeping of the receive beams of the UE 930. In some embodiments, the first TRP 910 may determine the measurement gap duration time based on the received duration time of the beam sweeping of the receive beams of the UE 930 and the duration time of the beam sweeping of the second TRP 920. For example, the first TRP 910 may determine the measurement gap duration time based on Equation (1) below.

$$t_{gap} = t_{Rx\ beam\ sweeping} \times t_{Tx\ beam\ sweeping}$$ Equation (1)

In Equation (1) $t_{Rx\ beam\ sweeping}$ denotes the duration time of the beam sweeping of the receive beams of the UE 930 $t_{Tx\ beam\ sweeping}$ denotes the duration time of, the beam sweeping of the second TRP 920, and $t_{gap}$ denotes the measurement gap duration time for performing the measurement on the reference signal of the second TRP 920. The information on the duration time of the beam sweeping of the second TRP 920 may be received by the first TRP 910 from the second TRP 920 through a communication path between the first TRP 910 and the second TRP 920. For example, the communication path may be an internal interface between the first TRP 910 and the second TRP 920. In another example, the communication path may be an X2 interface between the first TRP 910 and the second TRP 920. In still another example, the communication path may be an Si interface between the first TRP 910 and the second TRP 920.

In some embodiments, the first TRP 910 may determine the measurement gap duration time based on the received duration time of the beam sweeping of the receive beams of the UE 930 and the beam mode of the second TRP 920. Information on the beam mode of the second TRP 920 may be received by the first TRP 910 from the second TRP 920 through the communication path between the first TRP 910 and the second TRP 920.

In some embodiments, the first TRP 910 may determine the measurement gap duration time based on the duration of the beam sweeping of the receive beams of the general UE. When the measurement gap duration time is determined based on the duration time of the beam sweeping of the receive beams of the general UE, the determined measurement gap duration time may have a relatively large value or a conservative value. In this case, the operation of step S910 may be omitted.

In some embodiments, the first TRP 910 may determine the measurement gap duration time based on one or more pieces of the information on the duration time of the beam sweeping of the second TRP 920 or the information on the beam mode of the second TRP 920 without considering the information on the duration time of the beam sweeping of the receive beams of the UE 930. In this case, the operation of step S910 may be omitted.

The first TRP 910 may determine the measurement gap configuration for measuring the reference signal of the second TRP 920 based on the determined measurement gap duration time. The measurement gap configuration may include one or more pieces of information for indicating the determined measurement gap duration time, information on a reference position for initiating the measurement of the reference signal of the second TRP 920, and information on periodicity on which the measurement of the reference signal of the second TRP 920 is performed.

For example, the measurement gap configuration may include all or some of the information shown in Table 5 below.

TABLE 5 measurement gap periodicity
measurement gap offset
measurement gap duration

In Table 5 above, "measurement gap periodicity" denotes periodicity on which the measurement for the TRP having the inter-frequency is performed, "measurement gap offset" denotes a reference position for initiating the measurement for the TRP having the inter-frequency, and "measurement gap duration" denotes the time required for performing the measurement for the TRP having the inter-frequency once.

In some embodiments, the measurement gap configuration may include information on an index for indicating the determined measurement gap duration time. In this case, the measurement gap configuration may include all or some of the information shown in Table 6 below.

TABLE 6 measurement gap periodicity
measurement gap offset
measurement gap index

In Table 6 above, "measurement gap periodicity" denotes periodicity on which the measurement for the TRP having the inter-frequency is performed, "measurement gap offset" denotes a reference position for initiating the measurement for the TRP having the inter-frequency, and "measurement gap index" denotes a value for indicating the measurement gap duration time.

When the determined measurement gap configuration includes the measurement gap index, a table for indicating a relation between the measurement gap index and the measurement gap duration time may be shared between the first TRP 910 and the UE 930.

In step S930, the first TRP 910 may transmit an RRC message containing the measurement configuration including the determined measurement gap configuration to the UE 930. The measurement configuration may be a measurement configuration targeting the second TRP 920. According to embodiments, the measurement configuration including the determined measurement gap configuration may be transmitted through a message having the purpose different from that of the RRC message. For example, the measurement configuration including the determined measurement gap configuration may be transmitted through a Physical Downlink Shared Channel (PDSCH). The UE 930 may receive the measurement configuration from the first TRP 910.

In step S940, the second TRP 920 may broadcast the reference signal. The UE 930 may receive the reference signal based on the received measurement configuration. More specifically, the UE 930 may receive the reference signal broadcasted from the second TRP 920 based on the offset, the periodicity, and the measurement gap duration time indicated by the measurement gap configuration. For example, the UE 930 may initiate the measurement for the reference signal of the second TRP 920 at a time point included in the DRX and indicated by the offset included in the measurement gap configuration. In response to the initiation of the measurement for the reference signal of the second TRP 920, the UE 930 may receive the reference signal of the second TRP 920 based on data for indicating the measurement gap duration time included in the measurement gap configuration. The UE 930 may receive the reference signal of the second TRP 920 through beam sweeping of the receive beams of the UE 930.

In response to the reception of the reference signal of the second TRP 920, the UE 930 may perform the measurement on the reference signal of the second TRP 920 in step S950. In other words, the UE 930 may determine a value for indicating the state of the channel between the second TRP 920 and the UE 930 based on the reference signal of the second TRP 920.

In step S960, the UE 930 may transmit a measurement report containing the information on the value for indicating the state of the channel between the second TRP 920 and the UE 930 (that is, a result of the measurement for the reference signal of the second TRP 920) to the first TRP 910.

As described above, the TRP according to various embodiments of the present disclosure may determine the measurement gap duration time based on one or more of the duration time of the beam sweeping of the receive beams of the UE and the duration time of the beams weeping of the neighboring TRP having the inter-frequency, so as to adaptively control the measurement of the UE in the environment in which the TRPs having different beam modes, the UEs having different duration time of beam sweeping of receive beams, and the TRPs having different duration time of beam sweeping coexist. In other words, the TRP according to various embodiments of the present disclosure may guarantee mobility of the UE based on the measurement configuration including the measurement gap configuration including the adaptively changed measurement gap duration time. Further, the TRP may accurately determine the state of the channel between the neighboring TRP having the inter-frequency and the UE based on the measurement configuration including the measurement gap configuration including the adaptively changed measurement gap duration time.

Figure 10A:
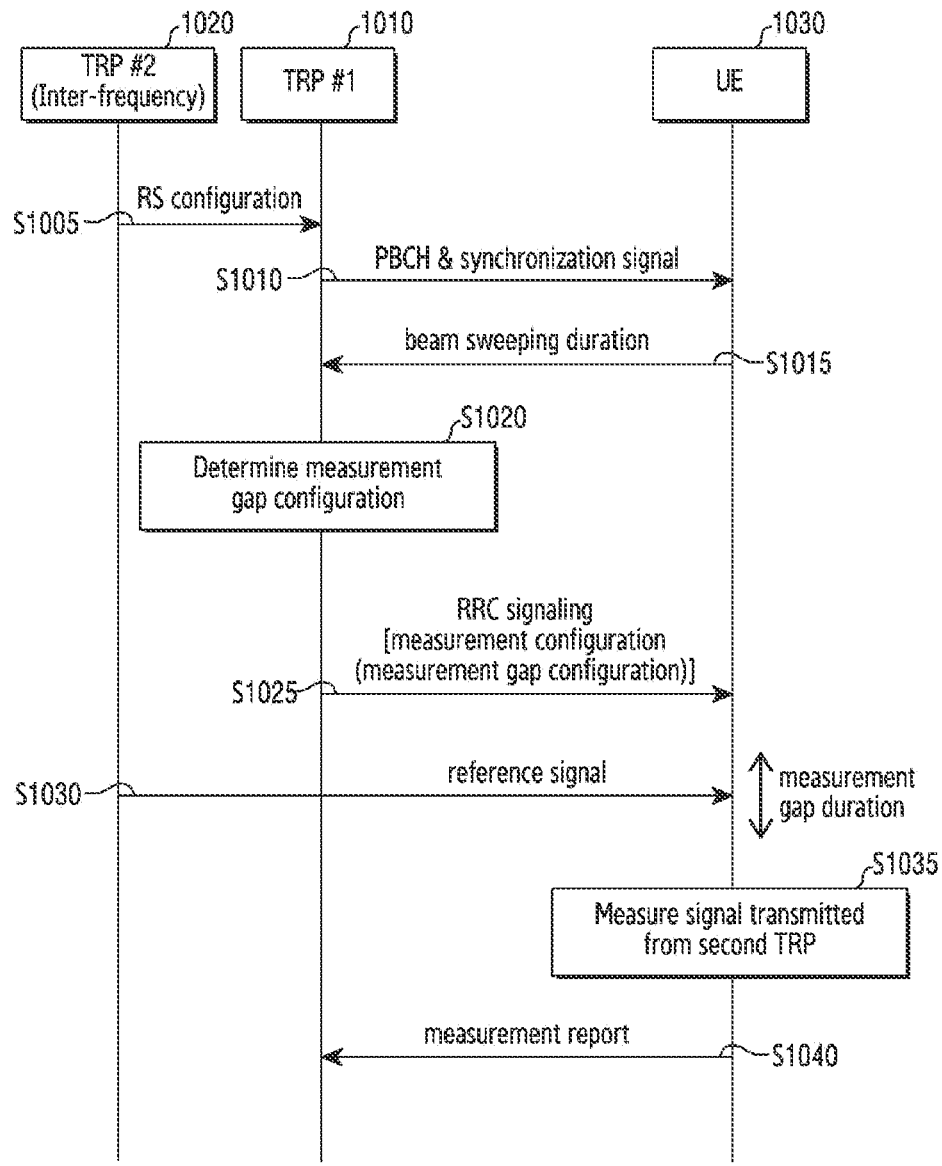
FIG. 10A illustrates an example of the signal flow between TRPs for determining a measurement gap configuration and a UE according to various embodiments of the present disclosure.

FIG. 10A illustrates an example of the signal flow between TRPs for determining a measurement gap configuration and a UE according to various embodiments of the present disclosure.

In FIG. 10A, a second TRP 1020 may be a TRP pertaining to a cell having a center frequency different from a center frequency of a cell to which a first TRP 1010 servicing a UE 1030 pertains. In other words, the second TRP 1020 may be a TRP having an inter-frequency of the first TRP 1010.

Referring to FIG. 10A, in step S1005, the second TRP 1020 may transmit information on a reference signal configuration of the second TRP 1020 to the first TRP 1010. The reference signal configuration of the second TRP 1020 may include one or more pieces of information on whether the reference signal of the second TRP 1020 is transmitted through beam sweeping, information on a pattern of the reference signal of the second TRP 1020, and information on a format of the reference signal of the second TRP 1020.

The information on the reference signal configuration of the second TRP 1020 may be transmitted through various communication paths. For example, the information on the reference signal configuration of the second TRP 1020 may be transmitted to the first TRP 1010 through an interval interface between the first TRP 1010 and the second TRP 1020, an X2 interface between the first TRP 1010 and the second TRP 1020, and an Si interface between the first TRP 1010 and the second TRP 1020. In another example, the reference signal configuration of the second TRP 1020 may be transmitted to the first TRP 1010 through another network entity. The first TRP 1010 may receive the reference signal configuration of the second TRP 1020 from the second TRP 1020. Further, the first TRP 1010 may identify information on whether the reference signal of the second TRP 1020 is transmitted through beam sweeping and information on a beam sweeping duration time for transmitting the reference signal of the second TRP 1020 based on the received reference signal configuration.

In step S1010, the first TRP 1010 may broadcast a broadcast signal and a synchronization signal. In some embodiments, the broadcast signal may contain information on the reference signal configuration of the first TRP 1010. Further, the broadcast signal may further contain information on the reference signal configuration of the second TRP 1020. In some embodiments, the synchronization signal may contain information on a beam mode indicator of the first TRP 1010. Further, the synchronization signal may further contain information on a beam mode indicator of the second TRP 1020. The UE 1030 may receive the broadcast signal (for example, the PBCH) and the synchronization signal broadcasted from the first TRP 1010.

In step S1015, the UE 1030 may transmit information on a beam sweeping duration time of receive beams of the UE 1030 to the first TRP 1010. In some embodiments, information on the beam sweeping duration time of the receive beams of the UE 1030 may include data directly indicating the beam sweeping duration time of the receive beams. In some embodiments, the information on the beam sweeping duration time of the receive beams of the UE 1030 may include an index indirectly indicating the beam sweeping duration time of the receive beams. The first TRP 1010 may receive the information on the beam sweeping duration time of the receive beams of the UE 1030 from the UE 1030.

In step S1020, the first TRP 1010 may determine a measurement gap configuration for measuring the reference signal of the second TRP 1020 based on the received information on the beam sweeping duration time of the receive beams of the UE 1030. In other words, the first TRP 1010 may determine a measurement gap duration time for measuring the reference signal of the second TRP 1020 based on the information on the beam sweeping duration time of the receive beams of the UE 1030 and determine the measurement gap configuration including information on the determined measurement gap duration time. In some embodiments, the first TRP 1010 may determine the measurement gap duration time based on the beam sweeping duration time for transmitting the reference signal of the second TRP 1020 determined based on the reference signal configuration of the second TRP 1020 and the beam sweeping duration time of the receive beams of the UE 1030.

In step S1025, the first TRP 1010 may transmit the RRC message containing the measurement configuration including the measurement gap configuration including the information on the determined measurement gap duration time to the UE 1030. The UE 1030 may receive the RRC message. In some embodiments, the RRC message may further contain information on the reference signal configuration of the second TRP 1020.

In step S1030, the second TRP 1020 may broadcast the reference signal. The UE 1030 may receive the reference signal broadcasted from the second TRP 1020 based on the measurement configuration contained in the received RRC message. In some embodiments, the UE 1030 may receive the reference signal based on the reference signal configuration of the second TRP 1020 and the measurement configuration contained in the RRC message. According to embodiments, the reference signal configuration of the second TRP 1020 may be contained in another separate message (for example, the broadcast signal of the second TRP 1020) which is not the RRC message.

In step S1035, the UE 1030 may perform the measurement on the reference signal of the second TRP 1020 in response to the reception of the reference signal of the second TRP 1020. The UE 1030 may calculate, determine, or identify a value for indicating the state (or quality) of a channel between the second TRP 1020 and the UE 1030 based on the reference signal of the second TRP 1020.

In step S1040, the UE 1030 may transmit a measurement report containing a result of the measurement for the reference signal of the second TRP 1020 to the first TRP 1010. In some embodiments, the measurement report may directly contain the value for indicating the state of the channel between the second TRP 1020 and the UE 1030. In some embodiments, the measurement report may contain an index for indirectly indicating the value for indicating the state of the channel between the second TRP 1020 and the UE 1030.

As described above, the TRP according to various embodiments of the present disclosure may receive the reference signal configuration of another TRP from the other TRP pertaining to the cell having the center frequency different from the center frequency of the cell to which the TRP pertains and receive information on the beam sweeping duration time of receive beams of the UE from the UE located within the coverage of the TRP, so that the UE may determine the measurement gap configuration for performing the measurement on the other TRP. The measurement gap configuration may include information on the measurement gap duration time determined based on the beam mode of the other TRP (or the beam sweeping duration time of the other TRP) and the beam sweeping duration time of the receive beams of the UE. In other words, the TRP may determine the measurement gap duration time in order to allow the UE to accurately perform the measurement on the different TRP. That is, the TRP may determine the measurement gap duration time to guarantee mobility of the UE.

Figure 10B:
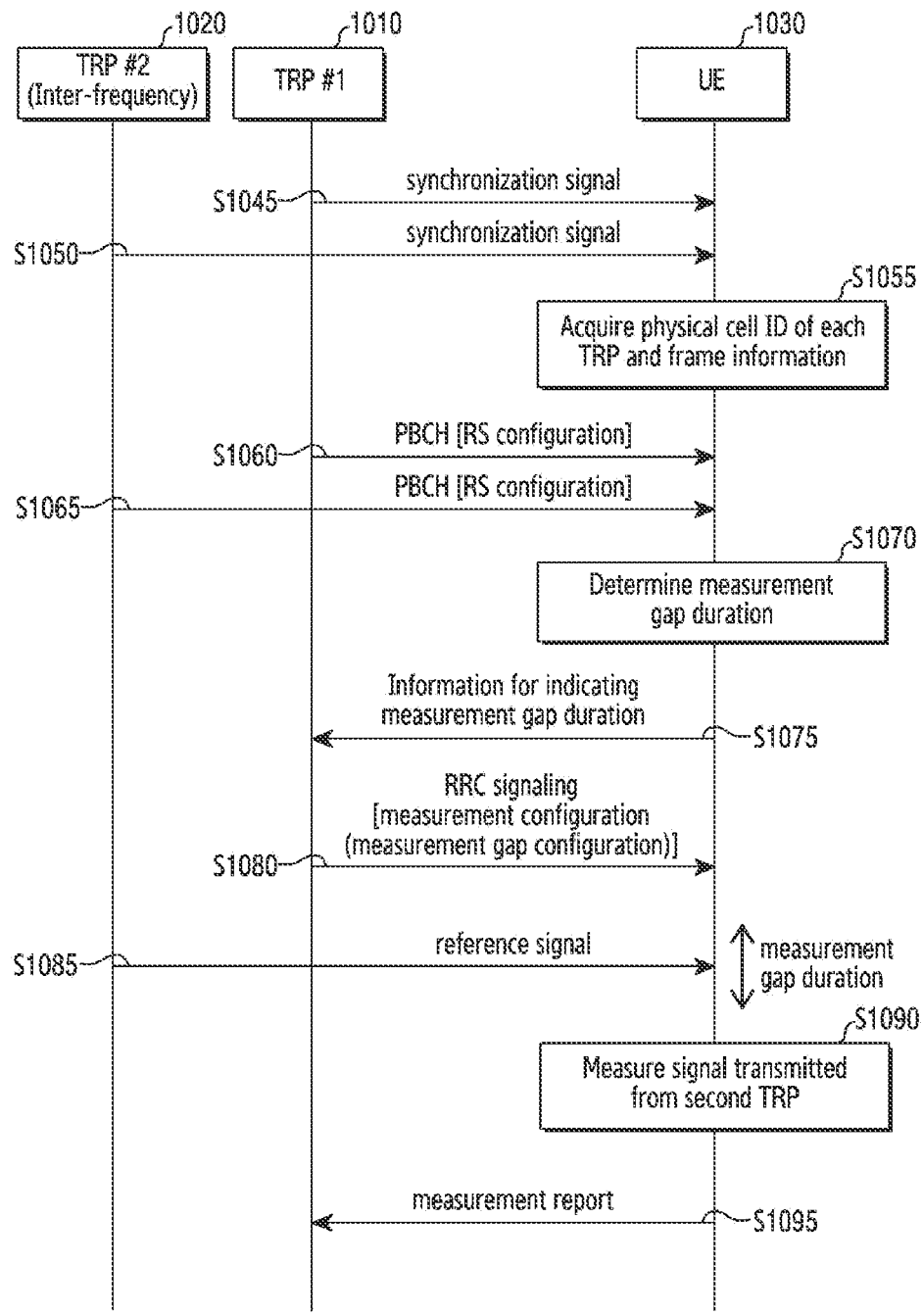
FIG. 10B illustrates an example of the signal flow between the UE for determining the measurement gap configuration and the TRPs according to various embodiments of the present disclosure.

FIG. 10B illustrates an example of the signal flow between the UE for determining the measurement gap configuration and the TRPs according to various embodiments of the present disclosure.

Referring to FIG. 10B, in step S1045, the first TRP 1010 may broadcast the synchronization signal. The UE 1030 may receive the synchronization signal transmitted or broadcasted from the first TRP 1010.

In step S1050, the second TRP 1020 may broadcast the synchronization signal. The UE 1030 may receive the synchronization signal transmitted or broadcasted from the second TRP 1020.

In step S1055, the UE 1030 may acquire a physical cell ID of the first TRP 1010 and frame information of the first TRP 1010 based on the synchronization signal received from the first TRP 1010. Further, the UE 1030 may acquire a physical cell ID of the second TRP 1020 and frame information of the second TRP 1020 based on the synchronization signal received from the second TRP 1020.

In step S1060, the first TRP 1010 may broadcast the synchronization signal (for example, the PBCH) containing the reference signal configuration of the first TRP 1010. The UE 1030 may receive the broadcast signal containing the reference signal configuration of the first TRP 1010.

In step S1065, the second TRP 1020 may broadcast the synchronization signal containing the reference signal configuration of the second TRP 1020. The UE 1030 may receive the broadcast signal containing the reference signal configuration of the second TRP 1020.

In step S1070, the UE 1030 may determine the measurement gap duration time for measuring the second TRP 1020. The UE 1030 may determine the beam sweeping duration time for transmitting the reference signal of the second TRP 1020 based on the reference signal configuration of the second TRP 1020 contained in the broadcast signal broadcasted from the second TRP 1020. The UE 1030 may determine the measurement gap duration time based on the beam sweeping duration time for transmitting the reference signal of the second TRP 1020 and the beam sweeping duration time of the receive beams of the UE 1030.

Although not illustrated in FIG. 10B, the UE 1030 may determine that the cell to which the first TRP 1010 pertains is a serving cell.

In step S1075, the UE 1030 may transmit information for indicating the determined measurement gap duration time to the first TRP 1010. In some embodiments, the information for indicating the determined measurement gap duration time may be a bit sequence directly indicating the determined measurement gap duration time or an index indirectly indicating the determined measurement gap duration time. In some embodiments, the information for indicating the determined measurement gap duration time may be transmitted through a random access procedure or through a procedure for informing the first TRP 1010 of capability of the UE 1030. The first TRP 1010 may receive the information for indicating the measurement gap duration time from the UE 1030.

In step S1080, the first TRP 1010 may transmit the RRC message containing the measurement configuration including the measurement gap configuration including the information on the measurement gap duration time determined by the UE 1030 to the UE 1030. The UE 1030 may receive the RRC message from the first TRP 1010.

In some embodiments, the first TRP 1010 may transmit, to the UE 1030, the RRC message containing the measurement configuration including the measurement gap configuration including the information on the measurement gap duration time determined (updated) based on the measurement gap duration time determined by the UE 1030.

In some embodiments, the first TRP 1010 may determine another measurement gap duration time for the UE 1030 in terms of the system regardless of the measurement gap duration time determined by the UE 1030. In this case, the first TRP 1010 may transmit the RRC message containing the measurement configuration including the measurement gap configuration including the information on the other measurement gap duration time to the UE 1030. Further, the first TRP 1010 may transmit information on a different value between the measurement gap duration time determined by the UE 1030 and the other measurement gap duration time which the first TRP 1010 desires to transmit through the measurement gap configuration. The difference value may be referred to as an offset. It is assumed that the first TRP 1010 and the UE 1030 share a table in which a difference value 0 ms is mapped to "00", a difference value 5 ms is mapped to "01", a difference value 10 ms is mapped to "10", and a difference value 15 ms is mapped to "11". In this case, when the measurement gap duration time determined by the UE 1030 is 10 ms and the measurement gap duration time which the first TRP 1010 desires to finally transmit to the UE 1030 is 10 ms, the first TRP 1010 may transmit the RRC message containing the measurement configuration including the measurement gap configuration including "00" as data for indicating the measurement gap duration time to the UE 1030. Based on the same principle, when the measurement gap duration time determined by the UE 1030 is 10 ms and the measurement gap duration time which the first TRP 1010 desires to finally transmit to the UE 1030 is 15 ms, the first TRP 1010 may transmit the RRC message containing the measurement configuration including the measurement gap configuration including "01" as data for indicating the measurement gap duration time to the UE 1030.

In step S1085, the second TRP 1020 may broadcast the reference signal. The UE 1030 may receive the reference signal at a time point indicated by the measurement gap configuration during the measurement gap duration time.

In step S1090, in response to the reception of the reference signal, the UE 1030 may perform the measurement on the second TRP 1020. The UE 1030 may determine a value for indicating the state of the channel between the UE 1030 and the second TRP 1020 through the measurement.

In step S1095, the UE 1030 may transmit the measurement report containing information on the value for indicating the state of the channel between the UE 1030 and the second TRP 1020 to the first TRP 1010. The first TRP 1010 may receive the measurement report.

As described above, based on the broadcast signal received from another TRP having an inter-frequency different from that of the serving TRP of the UE, the UE according to various embodiments of the present disclosure may determine the measurement gap duration time for measuring the other TRP. The measurement gap duration time is determined by the UE, and thus may be a value corresponding to the state of the UE. In other words, the UE may perform the measurement for its own mobility by determining the measurement gap duration time considering the environment around the UE.

A method of a User Equipment (UE) in a wireless environment according to various embodiments of the present disclosure as described above may include a process of receiving a reference signal configuration including information for indicating whether a reference signal of a Transmission and Reception Point (TRP) is transmitted through beam sweeping from the TRP that provides a service to the UE, and a process of receiving the reference signal from the TRP based on the received reference signal configuration.

In some embodiments, the reference signal configuration may further include information for indicating a number of at least one antenna port for transmitting the reference signal of the TRP and information for indicating a pattern for transmitting the reference signal of the TRP.

In some embodiments, when the information for indicating whether the reference signal of the TRP is transmitted through the beam sweeping indicates the transmission of the reference signal of the TRP through the beam sweeping, the reference signal configuration may further include information for indicating a time (duration) required for the beam sweeping. Further, the reference signal configuration may further include information for indicating periodicity for transmitting the reference signal of the TRP and information for indicating a carrier frequency for transmitting the reference signal of the TRP. In addition, the information for indicating the carrier frequency for transmitting the reference signal of the TRP may include one or more pieces of data for indicating an offset of the carrier frequency for transmitting the reference signal of the TRP and data for indicating a bandwidth of the carrier frequency for transmitting the reference signal of the TRP.

In some embodiments, the method of the UE may further include a process of receiving another reference signal configuration including information for indicating a number of at least one antenna port of another TRP for transmitting a reference signal of the other TRP pertaining to a cell having a center frequency corresponding to a center frequency of a cell, to which the TRP pertains, and information for indicating whether the reference signal of the other TRP is transmitted through beamforming from the TRP, and a process of receiving the reference signal transmitted from the other TRP based on the received reference signal configuration.

In some embodiments, the method of the UE may further include a process of receiving another reference signal configuration including information for indicating a number of at least one antenna port of another TRP for transmitting a reference signal of the other TRP pertaining to a cell having a center frequency corresponding to a center frequency of a cell, to which the TRP pertains and information for indicating whether the reference signal of the other TRP is transmitted through beamforming, and a measurement configuration for the other TRP from the TRP, wherein the measurement configuration for the other TRP may include information on a measurement gap configuration and the information on the measurement gap configuration may include data for indicating a measurement gap duration time (measurement gap duration). Further, the method of the UE may further include a process of receiving the reference signal transmitted from the other TRP during the measurement gap duration time in a time interval identified based on the measurement gap configuration on the basis of the received other reference signal configuration, and a process of transmitting a measurement report determined based on the reference signal received from the other TRP to the TRP.

A method of a Transmission and Reception Point (TRP) providing a service to a User Equipment (UE) in a wireless environment according to various embodiments of the present disclosure may include a process of receiving information for indicating a duration time (duration) of receive beam sweeping of the UE from the UE, a process of determining a measurement gap duration time (measurement gap duration) for another TRP pertaining to another cell having a center frequency different from a center frequency of a cell, to which the TRP pertains, based on the duration time of the receive beam sweeping of the UE, and a process of transmitting a measurement configuration including information on a measurement gap configuration including data for indicating the measurement gap duration time to the UE.

In some embodiments, the data for indicating the measurement gap duration time may be used by the UE to receive a reference signal transmitted from the other TRP during the measurement gap duration time.

In some embodiments, the information on the measurement gap configuration may further include data for indicating a measurement gap offset and data for indicating measurement gap periodicity. Further, the data for indicating the measurement gap offset and the data for indicating the measurement gap periodicity may be used by the UE to identify a time interval in which the reference signal is received.

Figure 11:
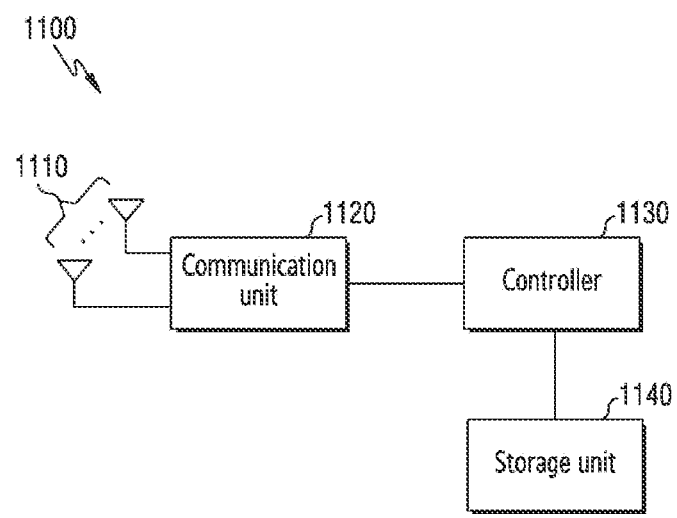
FIG. 11 illustrates an example of the functional configuration of a device according to various embodiments of the present disclosure.

FIG. 11 illustrates an example of the functional configuration of a device according to various embodiments of the present disclosure.

The functional configuration may be included in one of the eNB or the UE illustrated in FIGS. 1 to 10B.

Referring to FIG. 11, a device 1100 may include antennas 1110, a communication device 1120, a controller 1130, and a storage device 1140.

The antennas 1110 may include one or more antennas. The antennas 1110 may be configured to be suitable for a Multiple Input Multiple Output (MIMO) scheme.

The communication device 1120 may perform functions for transmitting or receiving a signal through a wireless channel.

The communication device 1120 may perform a function for conversion between a baseband signal and a bit stream according to the physical layer standard of the system. For example, when data is transmitted, the communication device 1120 may encode and modulate a transmission bit stream so as to generate complex symbols. In another example, when data is received, the communication device 1120 may demodulate and decode the baseband signal so as to reconstruct a reception bit stream.

The communication device 1120 may up-convert the baseband signal into an RF band signal and transmit the RF band signal through the antennas 1110. The communication device 1120 may down-convert the RF band signal received through the antennas 1110 into the baseband signal. For example, the communication device 1120 may include a transmission filter, a reception filter, an amplifier, a mixer, an oscillator, a Digital to Analog Convertor (DAC), an Analog to Digital Convertor (ADC), and the like.

The communication device 1120 may be operationally combined with the controller 1130.

The communication device 1120 may include at least one transceiver.

The controller 1130 may control the general operations of the device 1100. For example, the controller 1130 may transmit or receive the signal through the communication device 1120. The controller 1130 may record data in the storage device 1140 or read the data recorded in the storage device 1140. To this end, the controller 1130 may include at least one processor. For example, the controller 1130 may include a Communication Processor (CP) that performs a control for communication, and an Application Processor (AP) that controls a higher layer such as an application program.

The controller 1130 may be configured to implement the procedures and/or methods proposed by the present disclosure.

The storage device 1140 may store a control instruction, code, control data, or user data for controlling the device 1100. For example, the storage device 1140 may include an application, an Operating System (OS), middleware, and a device driver.

The storage device 1140 may include at least one of a volatile memory and a non-volatile memory. The volatile memory may include a Dynamic RAM (DRAM), a Static RAM (SRAM), a Synchronous DRAM (SDRAM), a Phrase-change RAM (PRAM), a Magnetic RAM (MRAM), a Resistive RAM (RRAM), Ferroelectric RAM (FeRAM), and the like. The non-volatile memory may include a Read Only Memory (ROM), a Programmable ROM (PROM), an Electrically Programmable ROM (EPROM), an Electrically Erasable ROM (EEPROM), a flash memory, and the like.

The storage device 1140 may include non-volatile media such as a Hard Disc Drive (HDD), a Solid State Disk (SSD), and embedded Multimedia Card (eMMC), and Universal Flash Storage (UFS).

The storage device 1140 may be operationally combined with the controller 1130.

Figure 12A:
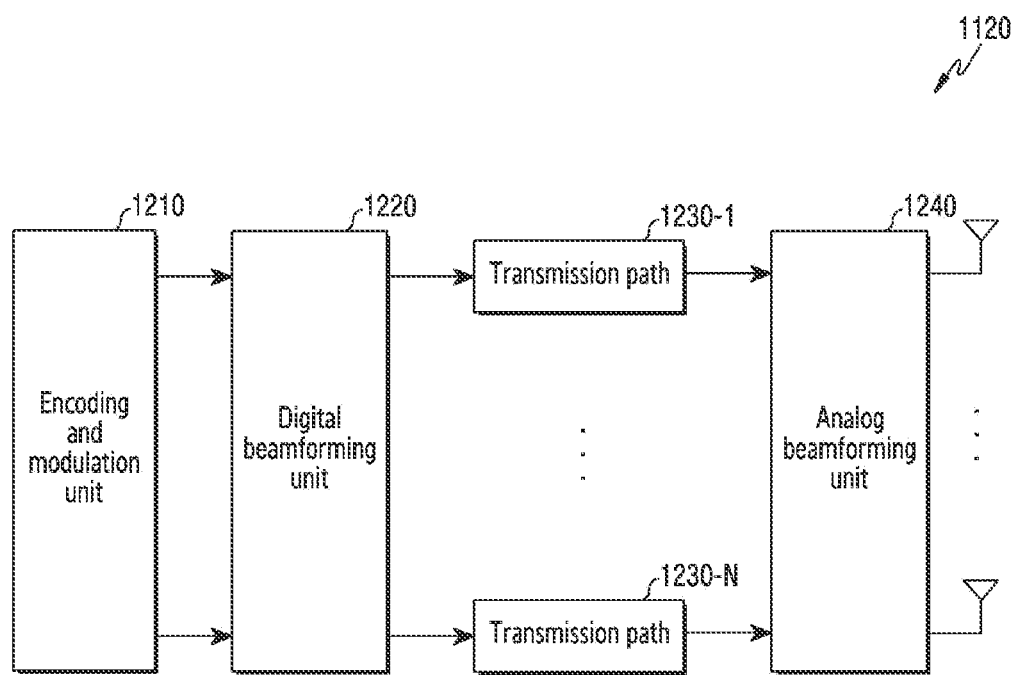
FIG. 12A illustrates an example of the functional configuration of a communication device according to various embodiments of the present disclosure.

FIG. 12A illustrates an example of the functional configuration of a communication device according to various embodiments of the present disclosure. The functional configuration of the communication device may be included in the communication device 1120 of the device illustrated in FIG. 11.

Referring to FIG. 12A, the communication device 1120 may include an encoding and modulation device 1210, a digital beamforming device 1220, a plurality of transmission paths 1230-1 to 1230-N, and an analog beamforming device 1240.

The encoding and modulation device 1210 may perform channel encoding. For the channel encoding, at least one of a Low-Density Parity Check (LDPC) code, a convolution code, a polar code, and a turbo code may be used. The encoding and modulation device 1210 may generate modulation symbols by performing constellation mapping.

The digital beamforming device 1220 may perform beamforming on digital signals (for example, the modulation symbols). To this end, the digital beamforming device 1220 may multiply the modulation symbols by beamforming weighted values. The beamforming weighted values may be used for changing the size and phrase of the signal, and may be referred to as a "precoding matrix" or a "precoder". The digital beamforming device 1220 may output digitally beamformed modulation symbols to at least one of the plurality of transmission paths 1230-1 to 1230-N. In some embodiments, the modulation symbols may be multiplexed according to the MIMO transmission scheme. In some embodiments, the digital beamforming device 1220 may output the same digitally beamformed modulation symbols used for a diversity gain to at least one of the plurality of transmission paths 1230-1 to 1230-N.

The plurality of transmission paths 1230-1 to 1230-N may convert digitally beamformed digital signals into analog signals. To this end, each of the plurality of transmission paths 1230-1 to 1230-N may include an Inverse Fast Fourier Transform (IFFT) calculation device, a Cyclic Prefix (CP) insertion device, a DAC, and an up-conversion device. The CP insertion device is for an Orthogonal Frequency Division Multiplexing (OFDM) scheme, and may be omitted when another physical layer scheme (for example, a Filter Bank Multi-Carrier: FBMC) is applied. In other words, the plurality of transmission paths 1230-1 to 1230-N may provide a signal processing process that is independent on a plurality of streams (or output modulation symbols) generated through digital beamforming. Some of the elements of the plurality of transmission paths 1230-1 to 1230-N may be used in common according to an implementation scheme.

The analog beamforming device 1240 may perform beamforming on the analog signal. To this end, the analog beamforming device 1240 may multiply analog signals by beamforming weighted values. The beamforming weighted values may be parameters for changing the size and phrase of the signals. Specifically, the analog beamforming device 1240 may be configured as illustrated in FIG. 12B according to the connection structure between the plurality of transmission paths 1230-1 to 1230-N and the antennas.

Figure 12B:
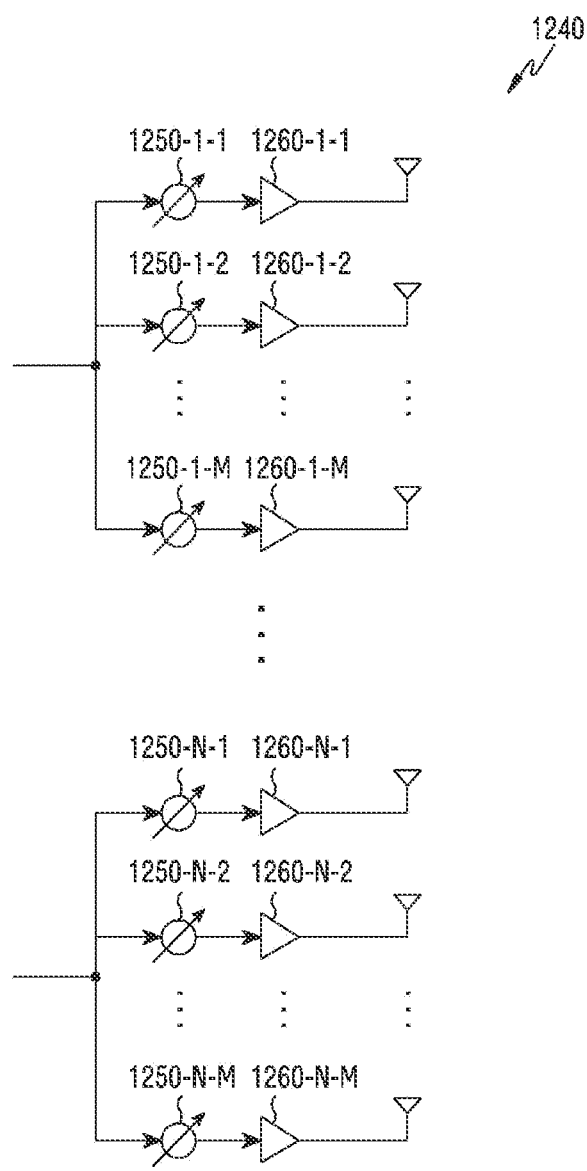
FIG. 12B illustrates an example of the functional configuration of an analog beamforming device according to various embodiments of the present disclosure.

FIG. 12B illustrates an example of the functional configuration of the analog beamforming device according to various embodiments of the present disclosure. The functional configuration may be included in the analog beamforming device 1240 of FIG. 12A.

Referring to FIG. 12B, signals input into the analog beamforming device 1240 may be transmitted through antennas via phrase/size conversion and amplification operation. The signals of the respective paths may be transmitted through different antenna sets, that is, antenna arrays. In consideration of processing of the signal input through a first path, the signal may be converted into signal streams having different phrases/sizes or the same phrase/size by phrase/size converters 1250-1-1 to 1250-1-M, amplified by amplifiers 1260-1-1 to 1260-1-M, and then transmitted through the antennas.

An apparatus of a User Equipment (UE) in a wireless environment according to various embodiments of the present disclosure as described above may include: at least one transceiver; and at least one processor connected to the at least one transceiver and configured to control reception of a reference signal configuration including information for indicating whether a reference signal of a Transmission and Reception Point (TRP) is transmitted through beam sweeping from the TRP that provides a service to the UE, and to control reception of the reference signal from the TRP based on the received reference signal configuration.

In some embodiments, the reference signal configuration may further include information for indicating a number of at least one antenna port for transmitting the reference signal of the TRP and information for indicating a pattern for transmitting the reference signal of the TRP.

In some embodiments, when the information for indicating whether the reference signal of the TRP is transmitted through the beam sweeping indicates the transmission of the reference signal of the TRP through the beam sweeping, the reference signal configuration may further include information for indicating a time (duration) required for the beam sweeping. Further, the reference signal configuration may further include information for indicating periodicity for transmitting the reference signal of the TRP and information for indicating a carrier frequency for transmitting the reference signal of the TRP. In addition, the information for indicating the carrier frequency for transmitting the reference signal of the TRP may include one or more pieces of data for indicating an offset of the carrier frequency for transmitting the reference signal of the TRP and data for indicating a bandwidth of the carrier frequency for transmitting the reference signal of the TRP.

In some embodiments, the at least one processor may be configured to control reception of another reference signal configuration including information for indicating a number of at least one antenna port of another TRP for transmitting a reference signal of the other TRP pertaining to a cell having a center frequency corresponding to a center frequency of a cell, to which the TRP pertains, and information for indicating whether the reference signal of the other TRP is transmitted through beamforming from the TRP, and to control reception of the reference signal from the other TRP based on the received reference signal configuration.

In some embodiments, the at least one processor may be configured to further control reception of another reference signal configuration including information for indicating a number of at least one antenna port of another TRP for transmitting a reference signal of the other TRP pertaining to a cell having a center frequency corresponding to a center frequency of a cell, to which the TRP pertains and information for indicating whether the reference signal of the other TRP is transmitted through beamforming, and a measurement configuration for the other TRP from the TRP, the measurement configuration for the other TRP including information on a measurement gap configuration, the information on the measurement gap configuration including data for indicating a measurement gap duration time (measurement gap duration). Further, the at least one processor is configured to control reception of the reference signal transmitted from the other TRP during the measurement gap duration time in a time interval identified based on the measurement gap configuration on the basis of the received other reference signal configuration, and to control transmission of a measurement report determined based on the reference signal received from the other TRP to the TRP.

An apparatus of a Transmission and Reception Point (TRP) providing a service to a User Equipment (UE) in a wireless environment according to various embodiments of the present disclosure may include: at least one transceiver; and at least one processor connected to the at least one transceiver and configured to control reception of information for indicating a duration time (duration) of receive beam sweeping of the UE from the UE, to determine a measurement gap duration time (measurement gap duration) for another TRP pertaining to another cell having a center frequency different from a center frequency of a cell, to which the TRP pertains, based on the duration time of the receive beam sweeping of the UE, and to control transmission of a measurement configuration including information on a measurement gap configuration including data for indicating the measurement gap duration time to the UE.

In some embodiments, the data for indicating the measurement gap duration time may be used by the UE to receive a reference signal transmitted from the other TRP during the measurement gap duration time. Further, the information on the measurement gap configuration may further include data for indicating a measurement gap offset and data for indicating measurement gap periodicity. The data for indicating the measurement gap offset and the data for indicating the measurement gap periodicity may be used by the UE to identify a time interval in which the reference signal is received.

In the present disclosure, the specific operation performed by the TRP may be performed by another entity that performs a function similar to that of the TRP according to embodiments. That is, it is apparent that various operations performed for communication with the UE in the network including a plurality of network nodes including the TRP can be performed by the TRP or other network nodes other than the TRP.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
receiving, from a base station, measurement configuration information through a radio resource control (RRC) signaling, wherein the measurement configuration information includes:
information on a duration of a measurement interval for one or more reference signals,
information on a periodicity and a time offset of the measurement interval,
information on a frequency channel number for the one or more reference signals,
information on a pattern for indicating at least one reference signal among the one or more reference signals,
receiving the at least one reference signal based on the measurement configuration information.

2. The method of claim 1,
wherein the at least one reference signal is measured on a bandwidth corresponding to the frequency channel number in the measurement interval.

3. The method of claim 1,
wherein the measurement configuration information further includes information associated with a measurement gap,
wherein the information associated with the measurement gap includes:
information on an offset for the measurement gap,
information on a periodicity for the measurement gap,
information on a duration for the measurement gap.

4. The method of claim 1,
wherein the measurement configuration information further includes:
information on a physical cell identity,
information on a reference timing of a measurement for a mobility.

5. A user equipment (UE) in a wireless communication system, the UE comprising:
at least one transceiver; and
at least one processor operably coupled to the at least one transceiver, wherein the at least one processor is configured to:
receive, from a base station, measurement configuration information for a measurement object through a radio resource control (RRC) signaling, wherein the measurement configuration information includes:
information on a duration of a measurement interval for one or more reference signals,
information on a periodicity and a time offset of the measurement interval,
information on a frequency channel number for the one or more reference signals,
information on a pattern for indicating at least one reference signal among the one or more reference signals,
receive the at least one reference signal based on the measurement configuration information.

6. The UE of claim 5,
wherein the at least one reference signal is measured on a bandwidth corresponding to the frequency channel number in the measurement interval.

7. The UE of claim 5,
wherein the measurement configuration information further includes information associated with a measurement gap,
wherein the information associated with the measurement gap includes:
information on an offset for the measurement gap,
information on a periodicity for the measurement gap,
information on a duration for the measurement gap.

8. The UE of claim 5,
wherein the measurement configuration information further includes:
information on a physical cell identity,
information on a reference timing of a measurement for a mobility.

9. A method performed by a base station in a wireless communication system, the method comprising:
transmitting, to a user equipment (UE), measurement configuration information for a measurement object through a radio resource control (RRC) signaling, wherein the measurement configuration information includes:
information on a duration of a measurement interval for one or more reference signals,
information on a periodicity and a time offset of the measurement interval,
information on a frequency channel number for the one or more reference signals,
information on a pattern for indicating at least one reference signal among the one or more reference signals, wherein the at least one reference signal is received at the UE based on the measurement configuration information.

10. The method of claim 9,
wherein the at least one reference signal is measured on a bandwidth corresponding to the frequency channel number in the measurement interval.

11. The method of claim 9,
wherein the measurement configuration information further includes information associated with a measurement gap,
wherein the information associated with the measurement gap includes:
information on an offset for the measurement gap,
information on a periodicity for the measurement gap,
information on a duration for the measurement gap.

12. The method of claim 9,
wherein the measurement configuration information further includes:
information on a physical cell identity,
information on a reference timing of a measurement for a mobility.

13. A base station in a wireless communication system, the base station comprising:
at least one transceiver; and
at least one processor operably coupled to the at least one transceiver, wherein the at least one processor is configured to:
transmit, to a user equipment (UE), measurement configuration information for a measurement object through a radio resource control (RRC) signaling, wherein the measurement configuration information includes:
information on a duration of a measurement interval for one or more reference signals,
information on a periodicity and a time offset of the measurement interval,
information on a frequency channel number for the one or more reference signals,
information on a pattern for indicating at least one reference signal among the one or more reference signals,
wherein the at least one reference signal is received at the UE based on the measurement configuration information.

14. The base station of claim 13,
wherein the at least one reference signal is measured on a bandwidth corresponding to the frequency channel number in the measurement interval.

15. The base station of claim 13,
wherein the measurement configuration information further includes information associated with a measurement gap,
wherein the information associated with the measurement gap includes:
information on an offset for the measurement gap,
information on a periodicity for the measurement gap,
information on a duration for the measurement gap.

16. The base station of claim 13,
wherein the measurement configuration information further includes:
information on a physical cell identity,
information on a reference timing of a measurement for a mobility.

* * * * *